US011313772B2

(12) United States Patent
Hewitt et al.

(10) Patent No.: US 11,313,772 B2
(45) Date of Patent: Apr. 26, 2022

(54) FIXATIVES AND METHODS OF USE

(71) Applicant: The United States of America, as represented by the Secretary, Dept. of Health and Human Services, Bethesda, MD (US)

(72) Inventors: Stephen M. Hewitt, Potomac, MD (US); Joon-Yong Chung, Rockville, MD (US); Candice D. Perry, Gaithersburg, MD (US); Robert A. Star, Bethesda, MD (US)

(73) Assignee: The United States of America, as represented by the Secretary, Department of Health and Human Services, Bethesda, MD (US)

( * ) Notice: Subject to any disclaimer, the term of this patent is extended or adjusted under 35 U.S.C. 154(b) by 637 days.

(21) Appl. No.: 15/774,480

(22) PCT Filed: Nov. 11, 2016

(86) PCT No.: PCT/US2016/061642
§ 371 (c)(1),
(2) Date: May 8, 2018

(87) PCT Pub. No.: WO2017/083729
PCT Pub. Date: May 18, 2017

(65) Prior Publication Data
US 2020/0041389 A1 Feb. 6, 2020

Related U.S. Application Data

(60) Provisional application No. 62/255,030, filed on Nov. 13, 2015.

(51) Int. Cl.
*G01N 1/30* (2006.01)
(52) U.S. Cl.
CPC ......... *G01N 1/30* (2013.01); *G01N 2001/307* (2013.01)
(58) Field of Classification Search
CPC .................................. G01N 1/30; G01N 33/55
See application file for complete search history.

(56) References Cited

U.S. PATENT DOCUMENTS

| | | | |
|---|---|---|---|
| 4,946,669 A | | 8/1990 | Siegfried et al. |
| 5,256,571 A | * | 10/1993 | Hurley ...................... A01N 1/02 435/1.1 |
| 5,958,688 A | * | 9/1999 | Eberwine ............. C12Q 1/6883 435/6.16 |
| 2002/0019011 A1 | * | 2/2002 | Stockwell .......... G01N 33/5008 435/7.1 |
| 2005/0074422 A1 | | 4/2005 | Visinoni |
| 2007/0072167 A1 | * | 3/2007 | Rochaix ................... G01N 1/30 435/4 |
| 2010/0009343 A1 | * | 1/2010 | Fischer ................ C12Q 1/6851 435/5 |
| 2014/0127745 A1 | | 5/2014 | Gonzaga et al. |
| 2015/0050689 A1 | | 2/2015 | Gerigk et al. |

FOREIGN PATENT DOCUMENTS

| | | |
|---|---|---|
| DE | WQ2015/181220 | * 12/2015 |
| EP | 0311035 | 4/1989 |
| EP | 1965190 | 9/2008 |
| WO | WO 1994/07532 | 4/1994 |
| WO | WO 2000/00813 | 1/2000 |
| WO | WO 2006/104333 | 10/2006 |
| WO | WO 2008/104564 | 9/2008 |
| WO | WO 2012/176065 | 12/2012 |
| WO | WO 2014/028839 | 2/2014 |

OTHER PUBLICATIONS

Harland, CSH Manual, 1997, pp. 1-15 (Year: 1997).*
Iourow et al, Brain Tissue Preparations for Chromosomal PRINS Labeling, 2006, Editor: Frank Pellestor, Chapter 12, pp. 123-132 (Year: 2006).*
Shakes et al, Immunofluorescence Microscopy, 2012, Method in Cell biology, pp. 35-66 (Year: 2012).*
Zhang et al, A novel trifluoromethyl benzopyran induces G1 cell cycle arrest and apoptosis in HELA human cervical carcinoma cells, 2013, International Journal of Oncology, 43, 469-476. (Year: 2013).*
Chung et al., "Optimization of recovery of RNA from formalin-fixed, paraffin-embedded tissue," *Diagn. Mol. Pathol.* vol. 15, No. 4, pp. 229-236, 2006.
Chung et al., "Factors in tissue handling and processing that impact RNA obtained from formalin-fixed, paraffin-embedded tissue," *J. Histochem. Cytochem.*, vol. 56, No. 11, pp. 1033-1042, 2008.
Chung et al., "The paraffin-embedded RNA metric (PERM) for RNA isolated from formalin-fixed, paraffin-embedded tissue," *BioTechniques*, vol. 60, No. 5, pp. 239-244, 2016.
Cold Spring Harbor Protocols, "Formaldehyde (2% in PBS)," doi:10.1101/pdb.rec066431, 2011 (1 page).
Cold Spring Harbor Protocols, "Paraformaldehyde in PBS," doi:10. 1101/pdb.rec9959, 2006 (1 page).
Cox et al., "Assessment of fixatives, fixation, and tissue processing on morphology and RNA integrity," *Experimental and Molecular Pathology*, vol. 80, pp. 183-191, 2006.

(Continued)

*Primary Examiner* — Narayan K Bhat
(74) *Attorney, Agent, or Firm* — Klarquist Sparkman, LLP

(57) ABSTRACT

Disclosed herein are compositions for fixing tissue for cytologic, histomorphologic, and/or molecular analysis (e.g., DNA, RNA, and/or protein analysis). In some embodiments, the fixatives are aldehyde-free fixatives, for example, formaldehyde- or formalin-free fixatives. Particular disclosed compositions include buffered ethanol. The buffer is a phosphate buffer or phosphate buffered saline (PBS) in some examples. In further embodiments, the fixative includes additional components, such as glycerol and/or acetic acid.

26 Claims, 22 Drawing Sheets

(56) References Cited

OTHER PUBLICATIONS

Fox et al., "Formaldehyde fixation," *J. Histochem. Cytochem.* vol. 33, No. 8, pp. 845-853, 1985.
Gillespie et al., "Evaluation of Non-Formalin Tissue Fixation for Molecular Profiling Studies," *American Journal of Pathology*, vol. 160, No. 2, pp. 449-457, 2002.
Harrison and Rogers, "Harrison's ethanol-acetic acid-formol-saline fixative (EAFS) is further improved by the incorporation of glycerol," *Laboratory Animals*, vol. 19, 1 p. 152, 1985.
Hewitt et al., "Tissue handling and specimen prepartation in surgical pathology: Issues concerning the recovery of nucleic acids from formalin-fixed, paraffin-embedded tissue," *Arch Pathol. Lab Med.*, vol. 132, No. 12, pp. 1929-1935, 2008.
Horobin and Kiernan, "Conn's biological stains: A Handbook of Dyes, Stains and Fluorochromes for Use in Biology and Medicine," *BIOS Scientific Publishers*, pp. 362-365, 2002.
Milcheva et al., "Alcohol based fixatives provide excellent tissue morphology, protein immunoreactivity and RNA integrity in paraffin embedded tissue specimens," *Acta Histochemica*, vol. 115, pp. 279-289, 2013.
Panzacchi et al., "Applying immunochemistry to alcohol-fixed paraffin-embedded tissues: an innovative technique to reduce use of formaldehyde," *Eur. J. Oncol,.* vol. 18, No. 2, pp. 75-83, 2013.
Perry et al., "A buffered alcohol-based fixative for histomorphologic and molecular applications," *J. Histochem. Cytochem.*, vol. 64, No. 7, pp. 452-440, 2016.
Rolls, "Fixation and Fixatives (4)—Popular fixative solutions," *Leica Biosystems*, available on the World Wide Web at http://www.leicabiosystems.com/pathologyleaders/fixation-and-fixatives-4-popular-fixative-solutions/, retrieved on Apr. 27, 2015 (9 pages).
Sigma-Aldrich Catalog, Formalin solution Product Information Sheet, available on the World Wide Web at http://www.sigmaaldrich.com/content/dam/sigma-aldrich/docs/Sigma/Product Information Sheet/2/ht501128pis.pdf, retrieved on Apr. 30, 2015 (2 pages).
Tokuda et al., "Fundamental study on the mechanism of DNA degradation in tissues fixed in formaldehyde," *J. Clin. Pathol.* vol. 43, pp. 748-751, 1990.
Uehara et al., "A Fixative Suitable for In Situ Hybridization Histochemistry," *The Journal of Histochemistry and Cytochemistry*, vol. 41, No. 6, pp. 947-953, 1993.
Viertler et al., "A New Technology for Stabilization of Biomolecules in Tissues for Combined Histological and Molecular Analyses," *The Journal of Molecular Diagnostics*, vol. 14, No. 5, pp. 458-466, 2012.
Wester et al., "Zinc-based fixative improves preservation of genomic DNA and proteins in histoprocessing of human tissues," *Lab. Invest.*, vol. 83, No. 6, pp. 889-899, 2003.
Wojcik et al., "Influence of Season on the Incidence of DNA Hypodiploidy in Urinary Cytology," *Cytometry (Communications in Clinical Cytometry)*, vol. 42, pp. 218-220, 2000.
Wu et al., "Solubility study of polyacrylamide in polar solvents," *J. Appl. Polymer Sci.* vol. 93, pp. 1493-1499, 2004.
Xie et al., "Factors influencing the degradation of archival formalin-fixed paraffin-embedded tissue sections," *Journal of Histochemistry & Cytochemistry*, vol. 59, No. 4, pp. 356-365, 2011.
Zanini et al., "Evaluation of two commercial and three homemade fixatives for the substitution of formalin: a formaldehyde-free laboratory is possible," *Environmental Health*, 11:59, 2012 (14 pages).

* cited by examiner

Sample:
1 - BE70
2 - BE70 + Guanidine HCL (1.60 M)
3 - BE70 + Guanidine HCL (0.80 M)
4 - BE70 + Guanidine Thiocyanate (1.02 M)
5 - BE70 + Guanidine Thiocyanate (0.51 M)
6 - BE70 + Guanidine Thiocyanate (1.69 M)
7 - NBF

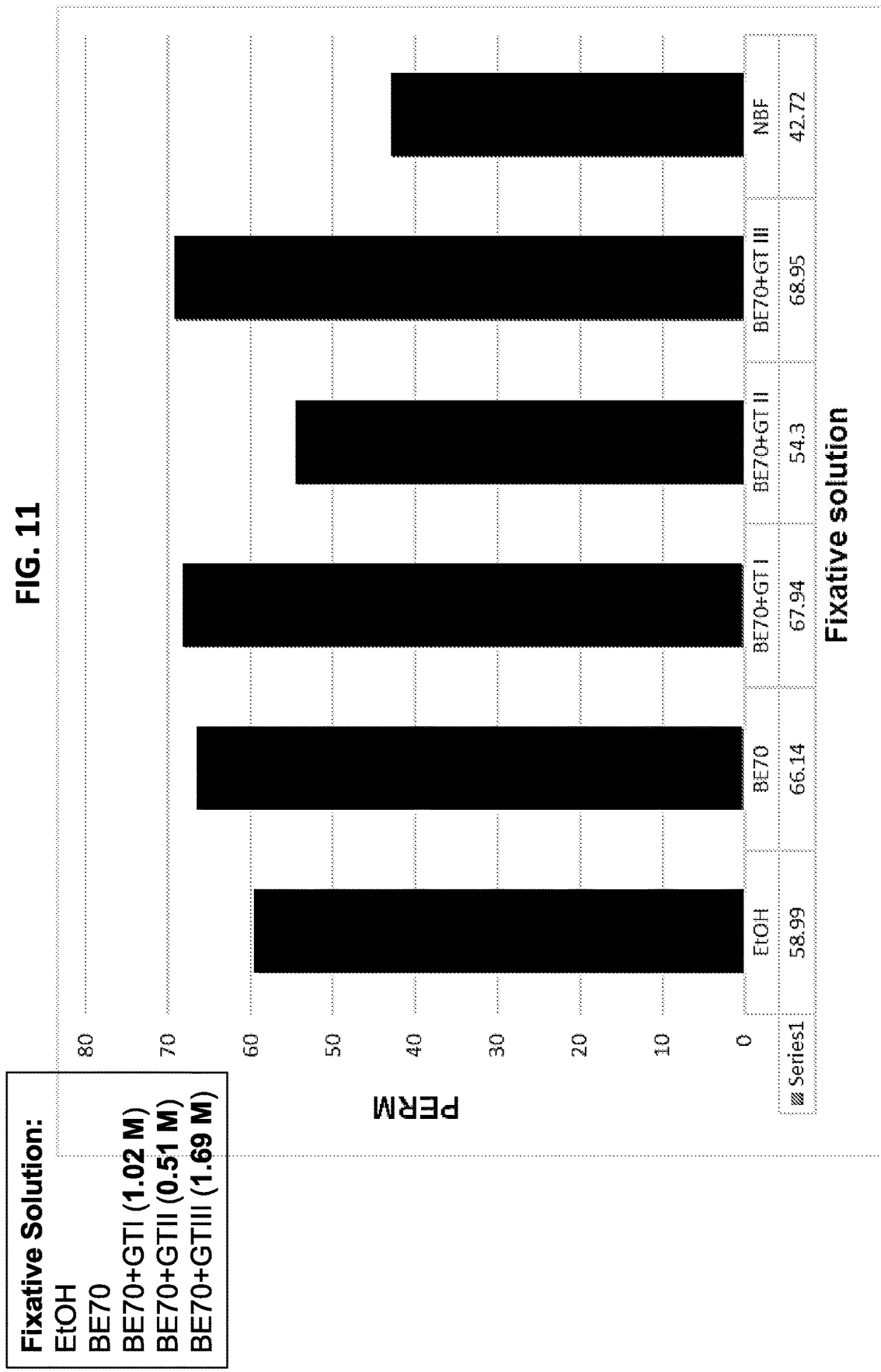

FIXATIVES AND METHODS OF USE

CROSS REFERENCE TO RELATED APPLICATIONS

This application is the § 371 U.S. National Stage of International Application No. PCT/US2016/061642, filed Nov. 11, 2016, which was published in English under PCT Article 21(2), which in turn claims the benefit of U.S. Provisional Application No. 62/255,030, filed Nov. 13, 2015, which is incorporated herein by reference in its entirety.

FIELD

This disclosure relates to preservation of cell or tissue samples, particularly compositions for fixing cell or tissue samples and methods of their use.

BACKGROUND

Microscopic examination of tissue for diagnostic histopathologic evaluation is most commonly performed on paraffin-embedded tissue. This paraffin-embedded tissue is frequently used for molecular diagnostics. The process of tissue embedding (also referred to as impregnation) requires the fixation of the tissue, followed by serial dehydration in alcohols, "clearing" (replacement of the alcohols with an organic solvent), and replacement of the organic solvent with paraffin (or a resin). With the advent of molecular pathology, especially RT-PCR, expression microarrays, RNA in situ hybridization, and RNAseq, the interest in obtaining RNA from paraffin-embedded archival tissue has increased. Studies on DNA, including DNA in situ hybridization, PCR, sequencing, mutation detection, genome wide association studies (GWAS), whole exome sequencing, whole genome sequencing and array comparative genomic hybridization (aCGH), are frequently applied to paraffin-embedded tissue. Evaluation of proteins and phospho-proteins may be performed by immunohistochemistry, or extracted proteins may be evaluated by western blots, protein array approaches or mass spectroscopy and hybrid technologies thereof.

The most commonly used fixative is neutral buffered formalin (NBF), a solution typically including 3.7-4% formaldehyde, 5-10% methanol, and phosphate buffer. Concurrent with the health issues of using formalin, this fixative crosslinks proteins, and both nicks and crosslinks RNA and DNA during tissue fixation. These chemical reactions render the primary biomolecules of interest in tissue damaged, and impairs assays on tissue. Methods to address this damage have been developed for proteins (antigen retrieval) and DNA (Klenow repair); however these only partially mitigate the damage. Furthermore, RNA is irreparably damaged during fixation with NBF and processing.

SUMMARY

There remains an ongoing need to develop fixatives that improve quality of molecular analysis, particularly analysis of RNA, obtained from fixed samples. In addition, there is substantial interest in reducing or eliminating the use of formaldehyde, due to its health and environmental risks, as well as associated costs and difficulties in disposing of solutions containing formaldehyde.

Disclosed herein are compositions for fixing tissue for cytologic, histologic, flow cytometry applications and/or molecular analysis (e.g., DNA, RNA, and/or protein analysis). In some embodiments, the fixatives are aldehyde-free fixatives, for example, formaldehyde- or formalin-free fixatives. Particular disclosed compositions (also referred to herein as "fixatives" or "fixative solutions") include buffered ethanol. In some embodiments, the buffer is a phosphate buffer or phosphate buffered saline (PBS). In further embodiments, the fixative includes additional components, such as glycerol and/or acetic acid. In one example, the fixative includes 70% ethanol, PBS, glycerol, and glacial acetic acid. A non-limiting example of a disclosed fixative is a solution (such as an aqueous solution) including 70% ethanol, 0.5×PBS, 1% glycerol, and 0.5% glacial acetic acid (referred to herein as BE70). The disclosed fixatives are compatible with current standard tissue processing protocols.

In additional embodiments, the disclosed fixatives include at least one component selected from ethanol, PBS, glycerol and glacial acetic acid and one or more additional components. In some examples, the additional components include a chaotrope or denaturant (for example, guanidinium thiocyanate, guanidinium HCl, or guanidinium acetate), trehalose, polyethylene glycol (e.g., PEG200), ethylenediaminetetraacetic acid (EDTA), ethylene glycol-bis(β-aminoethyl ether) ethylenediaminetetraacetic acid (EGTA), acrylamide, trichloroacetic acid, acetate salt (e.g., zinc acetate, copper acetate, or magnesium acetate), acetonitrile, and ethylene glycol. In some examples the disclosed fixatives are "modular" or "fit for purpose," e.g., the particular components are selected based on the planned use of the fixative (such as for applications using nucleic acids (RNA and/or DNA), protein, lipids, electron microscopy (EM), immunofluorescence, or histochemistry).

Also disclosed herein are compositions for preparation of the disclosed fixatives. In some embodiments, the composition is a "concentrate" such as an aqueous solution of 1) PBS plus 2) glycerol and/or acetic acid that is diluted to form a working solution with the desired final concentration of each component. In some embodiments, the concentrate is added to ethanol to arrive at the desired final (working) concentration of each component. In some examples, the composition is a concentrated solution for preparation of a disclosed fixative, for example, an aqueous solution containing 1.67×PBS plus 3.33% glycerol and/or 1.67% glacial acetic acid.

Methods of using the fixative solutions are also disclosed herein. In some embodiments, a biological sample (such as a cell or tissue sample) is immersed or submerged in the fixative under conditions sufficient to fix the sample. In additional embodiments, the fixed sample is processed for histological, cytological, and/or molecular analysis, for example by dehydrating, clearing, and/or embedding the fixed sample. In some examples, the fixed (and optionally processed sample) is used for molecular analysis, for example, analysis of one or more biomolecules in the sample (such as DNA, RNA, and/or protein).

The foregoing and other features of the disclosure will become more apparent from the following detailed description, which proceeds with reference to the accompanying figures.

BRIEF DESCRIPTION OF THE DRAWINGS

FIG. 3A shows the amount of protein extracted from each condition, measured using BCA Protein Assay Kit. The protein extraction yield was expressed the mean of three replicated samples (mean±SD). FIG. 3B shows protein integrity of different fixative solutions assessed by Western blotting (in triplicate, quantified by densitometry). Inset, digital image of representative Western blot. Relative GAPDH signal of each entity was normalized to NBF-fixed samples.

FIG. 4A is a graph showing amount of RNA extracted from each specimen measured by the Nanodrop spectrophotometer. The RNA extraction yield was expressed the mean of three replicated samples (mean±SD). FIG. 4B is a representative electropherogram showing an overlay of all seven different conditions. Inset shows an enlargement of the area enclosed in dotted lines. FF, fresh frozen mouse kidney (positive control). FIG. 4C is a graph showing integrity value of RNA presented as RNA quality metric (QM).

FIG. 5B shows an electropherogram overlay of EGAP and NBF fixative condition. Each symbol represents the difference between EGAP and NBF. The symbols correspond to the bands marked by the same symbol in FIG. 5A. FIG. 5C is a graph showing 18S rRNA expression levels as a box plot. The values are the average quantitative real-time RT-PCR cycle threshold numbers (Ct-values). The bars indicate standard deviation (n=3). FIG. 5D is a graph showing HPRT expression levels as a box plot. The values are the average quantitative real-time RT-PCR cycle threshold numbers (Ct-values). The bars indicate standard deviation. *, $p<0.05$; , $p<0.01$; *, $p<0.001$ (FIGS. 5C and 5D).

FIG. 6A is a graph showing amount of DNA extracted from each specimen is measured by the Nanodrop spectrophotometer. The DNA extraction yield was expressed the mean of three replicated samples (mean±SD). FIG. 6B is a graph showing DNA quality assessed by BioScore™ Screening and amplification kit. FIG. 6C is a graph showing average cycle threshold (Ct) values of a housekeeping gene (HPRT) tested in kidney under different fixative conditions. Gene expression levels are shown as box plot. The values are the average PCR Ct-values. The bars indicate standard deviation. *, $p<0.05$; , $p<0.01$;*, $p<0.001$.

FIG. 7A shows staining of Aquaporin antibody in kidney and FIG. 7B shows staining of Ki67 in spleen.

FIG. 8A shows total protein recovery. The data is normalized to the quantity of protein recovered from tissue fixed with BE70 for one day. FIGS. 8B and 8C show western blotting (top) and quantitation of the western blot data (bottom) for AKT (FIG. 8B) and GAPDH (FIG. 8C) for different fixation times with ethanol, BE70, or NBF.

FIG. 11 is a graph showing paraffin embedded RNA metric (PERM) for kidney tissue fixed with the indicated fixative for 24 hours.

DETAILED DESCRIPTION

Figure 1:
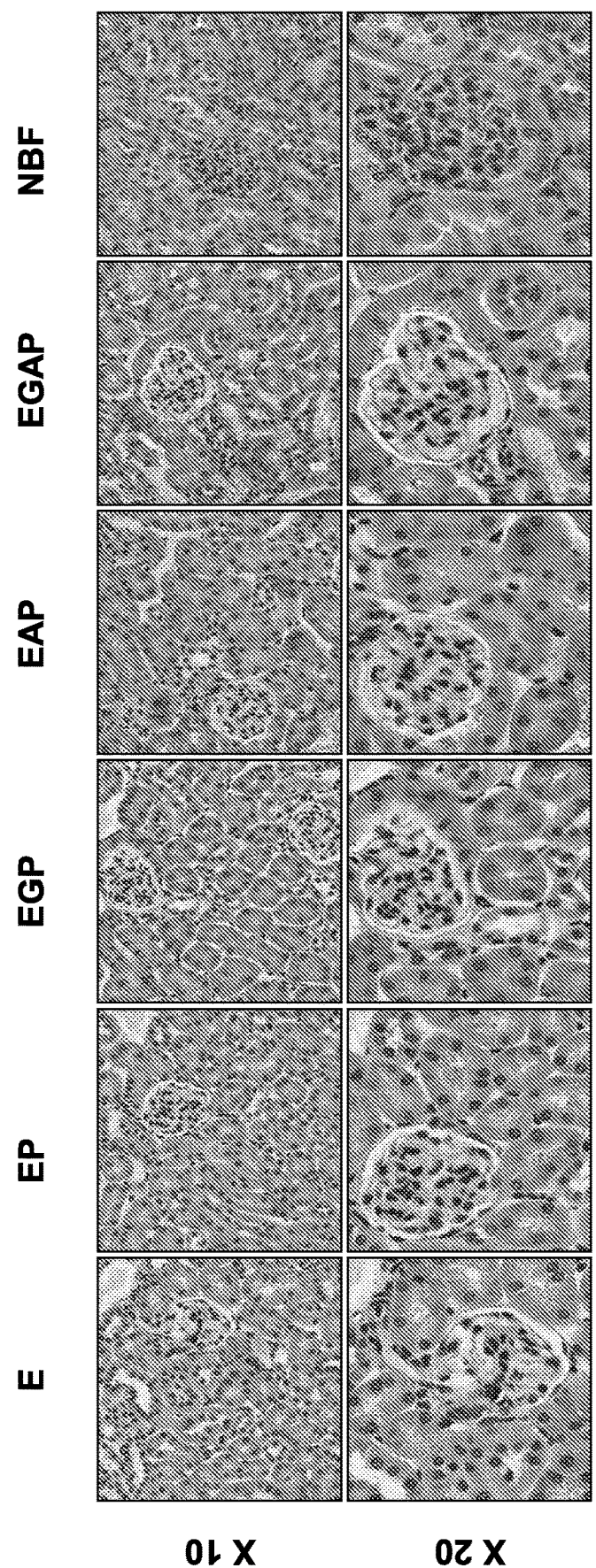
FIG. 1 is a series of digital images of photomicrographs of hematoxylin & eosin (H&E) stained mouse kidney tissue blocks following fixation for 24 hours with the indicated fixative and paraffin embedding. Processing conditions for all samples were identical. E, 70% ethanol; EP, 70% ethanol/ 0.5× phosphate buffered saline; EGP, 70% ethanol/1% glycerol/0.5×PBS; EAP, 70% ethanol/0.5% glacial acetic acid/ 0.5×PBS; EGAP (BE70), 70% ethanol/1% glycerol/0.5% glacial acetic acid/0.5×PBS; NBF, neutral buffered formalin 10%. These abbreviations are also used throughout the remaining figures.

Disclosed herein are buffered ethanol-containing fixatives that provide advantages over aldehyde-containing fixatives (such as NBF), particularly with respect to quality of nucleic acids (RNA and DNA) and proteins recovered from fixed and embedded tissues. With reference to cytologic and histomorphologic features, the disclosed buffered ethanol fixatives offer less shrinkage than unbuffered alcoholic fixatives. With respect to cytology and histomorphology, it is well known that formalin generates "reproducible artifacts" that are often used by pathologists in their diagnosis, and these differences may not be present with ethanol fixatives. The fixatives disclosed herein, particularly BE70, also generate a "reproducible artifact;" however, this artifact may not be identical to that imparted by NBF. In some examples, inclusion of glacial acetic acid in a buffered ethanol fixative may offset some of these differences, as it appears to add "crispness" to the cytologic features.

Immunohistochemistry on tissue fixed with the disclosed buffered ethanol fixatives can be optimized by routine methods and generates staining patterns of functionally identical features compared to NBF. Generally, non-cross-linking fixatives require less antigen retrieval than NBF fixed tissue, and tissue fixed with the buffered ethanol formulations disclosed herein follow this pattern. Some antigens may not be detectable in tissues fixed with buffered ethanol, e.g., with antibodies that have been selected for detection by immunohistochemistry on NBF fixed tissue. In these instances, dipping the deparaffinized slide in NBF for 10 seconds prior to antigen retrieval is commonly used to induce sufficient formalin-mediated chemical changes as to make the antigen detectable (see, e.g., Panzacchi et al., *Eur. J. Oncol.* 18:75-83, 2013). In some examples, the dipping of deparaffinized slides in NBF prior to antigen retrieval may not be necessary for samples fixed using the fixatives disclosed herein. This may be antigen-dependent and can be determined utilizing routine testing.

In addition to providing improved quality of cytologic, histomorphologic, and molecular analyses compared to NBF or other formaldehyde containing fixatives, the disclosed buffered ethanol fixatives provide improved ease of use and stability. Furthermore, because they do not contain formaldehyde, the disclosed fixatives present reduced hazards to personnel and the environment and are less expensive to dispose of than aldehyde-containing fixatives. In addition, the disclosed fixatives are not damaging to tissue processors, are not flammable, and are compatible with standard tissue processing protocols. Thus, the disclosed fixatives can be used as a direct replacement for NBF in tissue processing.

I. Abbreviations

E 70% ethanol
EAP 70% ethanol/0.5% glacial acetic acid/0.5×PBS
EGAP 70% ethanol/1% glycerol/0.5% glacial acetic acid/0.5×PBS, also referred to as BE70
EGP 70% ethanol/1% glycerol/0.5×PBS
EP 70% ethanol/0.5×PBS
H&E hematoxylin and eosin
NBF neutral buffered formalin
PBS phosphate buffered saline
QM RNA quality metric
RIN RNA integrity number II. Terms Unless otherwise noted, technical terms are used according to conventional usage. Definitions of common terms in molecular biology may be found in Benjamin Lewin, *Genes VII*, published by Oxford University Press, 2000 (ISBN 019879276X); Kendrew et al. (eds.), *The Encyclopedia of Molecular Biology*, published by Blackwell Publishers, 1994 (ISBN 0632021829); Robert A. Meyers (ed.), *Molecular Biology and Biotechnology: a Comprehensive Desk Reference*, published by Wiley, John & Sons, Inc., 1995 (ISBN 0471186341); and George P. Rédei, *Encyclopedic Dictionary of Genetics, Genomics, and Proteomics*, 2nd Edition, 2003 (ISBN: 0-471-26821-6).

Unless otherwise explained, all technical and scientific terms used herein have the same meaning as commonly understood by one of ordinary skill in the art to which this disclosure belongs. The singular terms "a," "an," and "the" include plural referents unless context clearly indicates otherwise. Similarly, the word "or" is intended to include "and" unless the context clearly indicates otherwise.

Although methods and materials similar or equivalent to those described herein can be used in the practice or testing of this disclosure, suitable methods and materials are described below. The term "comprises" means "includes." All publications, patent applications, patents, and other references mentioned herein are incorporated by reference in their entirety. In case of conflict, the present specification, including explanations of terms, will control. In addition, the materials, methods, and examples are illustrative only and not intended to be limiting.

Unless otherwise indicated, all numbers expressing quantities of components, molecular weights, percentages, pH, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under standard test conditions/methods. When directly and explicitly distinguishing embodiments from discussed prior art, the embodiment numbers are not approximates unless the word "about" is recited.

In order to facilitate review of the various embodiments of this disclosure, the following explanations of specific terms are provided:

Aldehyde-free: Lacking or substantially lacking presence of one or more aldehyde-containing compounds (such as formaldehyde, paraformaldehyde, or glutaraldehyde), for example, containing 0.5% or less of an aldehyde-containing compound. In some examples, aldehyde-free indicates that a composition lacks added or exogenous aldehyde-containing compounds (but for example, may include some amount of endogenous aldehyde-containing compounds).

Embedding medium: A substance in which tissue, such as fixed and dehydrated tissue is placed or enclosed. Exemplary embedding media include paraffin and resins, such as paraffin, paraffin-containing compounds, araldite, celloidin, Durcupan™, epoxy, glycol methacrylate, hydroxypropyl methacrylate, JB-4™, Spurr, LR White™, polyester, and polyethylene glycols.

Fixative: An agent or combination of agents that act as a preservative, for example, that renders an end to endogenous biologic processes (such as respiration and glycolysis) in cells or tissue. In addition, a fixative inhibits degradation (e.g. putrification), inhibits growth of bacteria, and renders the cells or tissue non-infectious. Fixatives can be used to preserve fresh tissue for subsequent examination (such as histology or molecular analysis).

Neutral buffered formalin (NBF): Also referred to as 10% neutral buffered formalin. A solution including approximately 3.7-4.0% formaldehyde in a buffer, typically a phosphate solution, of mono-basic and dibasic phosphate. NBF typically also includes 5-10% methanol (see, e.g., Fox et al., *J. Histochem. Cytochem.* 33:845-853, 1985).

Phosphate buffered saline (PBS): A solution containing sodium phosphate and sodium chloride, and typically also potassium phosphate and potassium chloride and having a pH of about 7.4. In particular embodiments, 1×PBS is a solution containing 137 mM NaCl, 2.7 mM KCl, 4.3 mM $Na_2HPO_4$, and 1.47 mM $KH_2PO_4$, with pH 7.4. In another example, 1×PBS is a solution containing 1.7 mM $KH_2PO_4$, 5 mM $Na_2HPO4$, 150 mM NaCl, pH 7.4. However, one of ordinary skill in the art will recognize that formulations for PBS vary and may not include KCl and/or $KH_2PO_4$, or may contain varying concentrations of the components. For example, in some cases, 1×PBS may contain about 150 mM NaCl. In its simplest formulation, 1×PBS contains about 10 mM phosphate and about 135-155 mM NaCl at pH 7.2-7.5. Optionally, PBS may also contain $CaCl_2$) and $MgCl_2$ (e.g., 1.33 g $CaCl_2.2H_2O$ and 1.0 g $MgCl_2.6H_2O$) in 1 liter of 1×PBS.

In some examples, PBS is prepared as a concentrated stock (such as 2×, 5×, 10×, or 20×) and is diluted with water to the desired concentration (such as 0.1×, 0.5×, or 1×) prior to use. PBS (for example in a concentrated stock solution, such as 10×PBS) is also commercially available, for example from Thermo Fisher Scientific (Waltham, Mass.) or Sigma-Aldrich (St. Louis, Mo.).

Sample: A biological specimen containing DNA, RNA (including mRNA), protein, or combinations thereof, obtained from a subject. Examples include, but are not limited to, peripheral blood, fine needle aspirate, cells (such as a cytology smear), and tissue. In some examples, "tissue sample" includes whole organs or a portion thereof, organ sub-structures, surgical tissue biopsies, punch biopsies, fine-needle aspirate biopsies, bone, biological fluids, archival tissues, or cells (including cells obtained from a subject or cells grown or cultured in vitro). The subject from which a sample is obtained includes any single-celled organism (e.g., bacteria or fungus), plant, or vertebrate organism (including but not limited to human, non-human primate, veterinary or laboratory animal, rodent, horse, sheep, cow, pig, bird, reptile, or amphibian).

III. Fixative Solutions

Disclosed herein are compositions for fixing tissue, for example, for cytologic, histologic, flow cytometry and/or molecular analysis (e.g., DNA, RNA, and/or protein analysis). In some embodiments, the disclosed compositions (referred to herein as "fixatives" or "fixative solutions") include buffered ethanol. In some embodiments, the fixatives are aldehyde-free or substantially aldehyde-free fixatives, for example, fixatives that contain 0.5% or less aldehydes and/or that do not include added formaldehyde, formalin, paraformaldehyde, glutaraldehyde, or other aldehyde-containing compounds. In additional embodiments, the fixatives are non-crosslinking fixatives, for example, fixatives that do not crosslink protein and/or do not result in substantial nicking or crosslinking of RNA or DNA. In the description of the fixative solutions provided herein, all amounts are by volume (v/v).

The disclosed fixatives include ethanol and a buffer. In some embodiments, the fixatives also include additional components, such as glycerol and/or acetic acid. In particular examples, the fixatives disclosed herein produce less tissue shrinkage and hardening than is observed in tissues fixed with 70% ethanol and produce tissue histomorphology that is functionally comparable to that obtained with the benchmark NBF. Furthermore, tissue fixed with the disclosed buffered ethanol fixatives result in improved RNA recovery, both in terms of quantity of RNA, as well as higher RNA quality (for example, recovery of longer RNA fragments) than is observed with tissue fixed with 70% ethanol alone.

In addition, the disclosed fixatives provide improved qualities when compared to NBF. In some examples, tissue fixed with the fixatives disclosed herein including ethanol and a buffer provide improved RNA quality (for example, as reflected by RNA quantity or fragment length, or as measured by RNA quality metric (QM) or RNA integrity number (RIN)) than tissues fixed under the same conditions with NBF. In additional examples, tissues fixed with the fixatives disclosed herein including ethanol and a buffer result in more sensitive detection of RNA or DNA (for example, based on cycle threshold in real-time PCR) than tissues fixed under the same conditions with NBF. In further examples, the disclosed fixatives provide substantially identical or improved tissue staining results (for example, improved hematoxylin staining) compared to tissue fixed with NBF. In a specific example, and without being bound by theory, it is believed that the buffering and pH range of the disclosed fixatives normalizes the intensity of hematoxylin staining across different tissues. In addition, it is believed that improved histology (preservation) of tissue contributes to the improved staining characteristics imparted by the disclosed fixatives.

In particular embodiments, the fixative includes 70-80% ethanol and a buffer (for example, a phosphate buffer or PBS). In some examples, the fixative includes 70-75% ethanol, 73-78% ethanol, or 76-80% ethanol. In particular examples, the fixative includes 70% ethanol. In some examples, the buffer is PBS (e.g., 1×PBS is 1.7 mM $KH_2PO_4$, 5 mM $Na_2HPO_4$, 150 mM NaCl, pH 7.4 or 137 mM NaCl, 2.7 mM KCl, 4.3 mM $Na_2HPO_4$, and 1.47 mM $KH_2PO_4$, pH 7.4, though other variations of PBS can also be used). The amount of PBS included in the fixative solution ranges from 0.1×-1×, for example 0.2×-0.8×, 0.1-0.5×, or 0.4-1×. In particular examples, the amount of PBS in the fixative solution is 0.1×, 0.2×, 0.4×, 0.5×, 0.6×, 0.8×, or 1×. One specific non-limiting example of a fixative disclosed herein contains 70% ethanol and 0.5×PBS.

Without being bound by theory, it is believed that including saline in the fixative (e.g., in the form of PBS) contributes to cytomorphology quality, such as reducing cell shrinkage, most likely by exerting osmotic effects. However, saline is not required in the buffered ethanol fixatives disclosed herein. Buffers that do not include saline (such as a phosphate buffer without saline) can also be used. In other examples, a buffer that does not include phosphate is used, such as Tris, $CaCl_2$), 2-[4-(2-hydroxyethyl)piperazin-1-yl] ethanesulfonic acid (HEPES), or 3-(N-morpholino)propanesulfonic acid (MOPS).

The pH of the fixatives disclosed herein have a final pH of 5 to 8, for example, pH 5-6, 5.5-6.5, 6-7, 6.5-7.5, 6.5-7, 7-7.5, or 7-8. For example, the pH can be 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, or 8. In some non-limiting examples, the fixatives have a pH of 6.5. In other non-limiting examples, the fixatives have a pH of 7. In further non-limiting examples, the pH of the fixatives is 6.1. In some examples, the pH of the fixative is adjusted (for example, with NaOH) following mixing of the components to achieve the desired final pH.

In further embodiments, the buffered ethanol fixative includes additional components. In some examples, the additional components include glycerol and/or acetic acid.

In some embodiments, the fixative includes ethanol, a buffer and glycerol. In particular examples, the fixative includes ethanol and a phosphate buffer (such as PBS) in any combination of amounts as described above, plus 0.1-10% glycerol, such as 0.2-5%, 0.5-3%, 0.1-2%, 1-5%, 2-6%, or 3-10%. In some examples, the amount of glycerol in the fixative is 0.1%, 0.2%, 0.5%, 0.75%, 1%, 2.5%, 5%, 7.5%, or 10%. In some examples, the fixative includes 70% ethanol, 0.1×-1×PBS, and 0.1-10% glycerol. In one specific non-limiting example, the fixative includes 70% ethanol, 0.5×PBS, and 1% glycerol. Without being bound by theory, presence of glycerol in the disclosed fixatives may improve cell membrane penetration of the fixative during tissue fixation. However, inclusion of glycerol is not required in the fixatives disclosed herein.

In other embodiments, the fixative includes ethanol, a buffer, and an acid (such as glacial acetic acid or picric acid). In particular examples, the fixative includes ethanol and a phosphate buffer (such as PBS) in any combination of amounts as described above, plus 0.1-10% acetic acid, such as 0.1-5%, 0.5-3%, 1-10%, 0.5-2.5%, 2-6%, 5-7.5%, or 4-10%. In some examples, the amount of acetic acid in the fixative is 0.1%, 0.2%, 0.3%, 0.4%, 0.5%, 0.75%, 1%, 2%, 3%, 4%, or 5%. In some examples, the fixative includes 0.5% glacial acetic acid. In some examples, the fixative includes 70% ethanol, 0.1×-1×PBS, and 0.1-5% glacial acetic acid. In one specific and non-limiting example, the fixative includes 70% ethanol, 0.5×PBS, and 0.5% glacial acetic acid. Without being bound by theory, presence of acetic acid in the disclosed fixatives may provide improved (e.g. clearer or sharper) histomorphology and/or enhanced cell penetration of the fixative. The fixatives including acetic acid disclosed herein may also provide improved quality of DNA recovered from fixed tissue. However, inclusion of acetic acid (or other acid) is not required in the fixatives disclosed herein.

In still further embodiments, the fixative includes ethanol, a buffer, glacial acetic acid, and glycerol. In particular examples, the fixative includes ethanol, buffer (such as phosphate buffer, for example PBS), glacial acetic acid, and glycerol in any combination of amounts as described above or shown in Tables 1-3. In some examples, the fixative includes 70% ethanol, 0.1×-1×PBS, 0.1-10% glycerol, and 0.1-5% glacial acetic acid. In one non-limiting example, the fixative includes or consists of 70% ethanol, 0.5×PBS, 1% glycerol, and 0.5% glacial acetic acid.

Also disclosed are additional embodiments of the fixatives that include alterations to one or more of the components (e.g., an increased or decreased amount), inclusion of one or more additional components, or both. In some embodiments, the disclosed fixatives may be modular, e.g., one or more components may be added or removed depending on the intended purpose or use of the fixed cells or tissues (such as RNA or DNA recovery and analysis, protein recovery and analysis, flow cytometry, electron microscopy, histomorphology, immunofluorescence, and so on). Table 1 sets out various components that can be included in a fixative composition. In certain embodiments, at least one of the additional components could be added to a base fixative that includes ethanol and PBS. In certain embodiments, the base fixative is particularly 70% ethanol and 0.5×PBS. Paraformaldehyde and/or glutaraldehyde are only used as fixative additives for purposes of EM and infectious disease pathology.

Guanidinium salt(s) may replace "unfreezable/non-freezable water" with protection of RNA, DNA and protein via hydrogen bonds. Guanidinium, by replacing "unfreezable/non-freezable water", may improve biological specimen stability, by reducing the opportunity for hydrolysis and oxidation of nucleic acids and proteins. See Boi, Scalia, Gendusa, Ronchi, and Cattoretti, Disaccharides Protect Antigens from Drying-Induced Damage in Routinely Processed Tissue Sections, J Histochem Cytochem January 2016 64: 18-31, for an explanation of "non-freezable water". Illustrative guanidinium salts include guanidinium HCl, guanidinium thiocyanate, guanidinium acetate, guanidinium sulfate, guanidinium nitrate, guanidinium nitrate, guanidinium carbonate, guanidinium formate and guanidinium phosphate.

TABLE 1

Exemplary fixative components and their use in specific applications of the fixed cells or tissue

| Additive | Amount in illustrative embodiment | Impact | Specific Application |
|---|---|---|---|
| Water | | | |
| Ethanol | 70% | — | — |
| EDTA or EGTA | Saturation | Remove Divalent Ions | 1. Decalcification 2. DNA Isolation |
| Glycerol | Up to 10% | Improved Biomolecular Recovery | Base Fixative in certain embodiments |
| Acetic Acid | Up to 7% | Cell Penetration | Increases Rate of Cell Penetration (Flow Cytometry) |
| NaOH | | raise pH | |
| PBS concentrate | 0.5X | osmotic balance; osmolyte | off-sets shrinkage of high concentrations of EtOH, and improves access to proteins after coagulation |
| Guanidinium Salts | Saturation | chaotrope | improved nucleic acids and proteins |
| Trehalose | 0.1%-saturation | chaotrope | Improved nucleic acids |
| Acrylamide | Up To 0.4% | matrix | EM |
| Polyethylene Glycol (200 MW) | 0.1%-saturation | matrix | EM |
| Trichloroacetic Acid (TCA) | Less than 25% | Cellular penetration | EM |
| Acetate | 0.1%-saturation | Cell pentration | Flow Cytometry; EM |
| Acetonitrile | 0.1%-saturation | cellular penetration | EM |
| Ethylene Glycol | 0.1%-saturation | cellular penetration | protein |
| paraformaldehyde | Saturation | crosslinking | EM & Infectious Disease Pathology |
| glutaraldehyde | Saturation | crosslinking | EM & Infectious Disease Pathology |

The disclosed fixatives are stable at room temperature for at least 3 months and do not precipitate at 4° C. for at least one month, making them suitable for laboratory storage. Furthermore, if precipitate develops upon storage at 4° C., the precipitate goes back into solution upon mixing. In some examples, the fixative is stable at 4° C. for at least 3 months, at least 6 months, at least 12 months, or more.

In additional embodiments, disclosed herein are compositions that include each of the fixative components except for ethanol, for example, prepared as a concentrate. The final ("working") fixative solution is prepared by adding the concentrate to ethanol to provide the desired final concentration of ethanol and the other components. The concentrate is stable at room temperature and 4° C., making it suitable for laboratory storage and providing convenient usage by preparing working solutions as needed. In some cases, the concentrate develops a precipitate upon storage at 4° C., but the precipitate easily goes back into solution and does not affect performance. In some examples, the concentrate is stable at 4° C. for at least 3 months, at least 6 months, at least 12 months, or more.

Thus, in some embodiments, the disclosure provides compositions (e.g., concentrates) including phosphate buffer (for example, PBS) plus glycerol and/or glacial acetic acid in a more concentrated form than in the fixative solutions disclosed herein. For example, the concentrate includes each of the components combined in an aqueous solution such that it can be added to ethanol (such as 100% ethanol or 95% ethanol) to produce the desired final concentration of the fixative components. For example, the components can be formulated as a solution such that about 25-30 ml of the concentrate, when added to 95%-100% ethanol to a final volume of 95-100 ml, produces a solution with the desired final concentration of the components, including 70% ethanol. Thus, in one non-limiting example, the concentrate includes or consists of 1.67×PBS, 3.33% glycerol, and 1.67% glacial acetic acid in an aqueous solution. In this example, a working solution is prepared by mixing 30 ml of the stock solution with 100% ethanol to arrive at a volume of 100 ml (giving a final concentration of 70% ethanol in the solution). In some examples, the concentrate is prepared by combining PBS (such as 10×PBS), glycerol (such as 10% (v/v) glycerol), and glacial acetic acid in the listed order, followed by addition of water to produce a concentrate with the desired concentration of each component. The pH of the concentrate can be adjusted after mixing the PBS, glycerol, and glacial acetic acid (for example, prior to adding water), to achieve a desired pH. In one example, the pH of the concentrate is 4.3. One of ordinary skill in the art can produce concentrates for preparation of any of the fixatives disclosed herein.

IV. Methods of Tissue Fixation

Methods of fixing tissue with the fixative solutions are provided herein. In some embodiments, the methods include immersing or submerging a biological sample in a fixative solution disclosed herein. Exemplary samples that can be used in the methods disclosed herein include, but are not limited to, whole organs or a portion thereof, organ substructures, surgical tissue biopsies, punch biopsies, fine-needle aspirate biopsies, bone, archival tissues, or cells. In other examples, samples include specimens after dissection by a pathologist or laboratory technician, and in some instances immersed in fixative, dissected (e.g., sectioned) and re-immersed in fixative. In some examples, these biological samples are referred to as "tissues" or "tissue samples." In cases where a sample is large, it can be cut into smaller pieces (such as pieces 2 mm thick or less), for ease of handling and improved fixative penetration. In other examples, a large specimen is immersed in the fixative whole, and remains immersed for a suitable period of time for the specimen to be fixed (e.g., days or weeks).

In some embodiments, the methods include immersing (for example completely covering) a sample with a fixative solution disclosed herein under conditions sufficient to fix the sample. In some examples, the tissue or sample is immersed in a 10- to 20-fold excess volume of fixative solution; however, this can be varied, for example from "equal volume" fixation (1:1 by fluid displacement) to greater than 100-fold excess volume. The tissue remains immersed in the fixative solution for a sufficient time to fix the tissue, for example at least 1 hour, 2 hours, 4 hours, 6 hours, 12 hours, 18 hours, 24 hours, 36 hours, 48 hours, or more (such as 2-12 hours, 4-18 hours, 6-72 hours, 8-48 hours, 12-24 hours, or 16-36 hours). In particular examples, the sample is immersed in the fixative for about 24 hours. However, one of ordinary skill in the art can determine suitable fixation times for particular types and sizes of specimens using routine testing methods.

The fixation is carried out a 4° C.-45° C., such as at 4° C., room temperature (e.g., about 20-25° C.), 30° C., 37° C., or 45° C. (for examples, 4-12° C., 18-25° C., 30-45° C., 32-42° C.). In other examples, the fixation is accelerated by microwave or ultrasound. In specific examples, the fixation is carried out at room temperature. In one particular example, the sample is fixed by immersing the sample in a fixative disclosed herein for 24 hours at room temperature. In further embodiments, fixation can be as short as 4 hours and as long as one month, depending of the assay, without degradation of the biomolecules and morphology. One of ordinary skill in the art can determine fixation conditions (such as time and/or temperature of fixation) for a particular sample or sample type utilizing routine methods.

In some embodiments, following fixation, the sample is processed and embedded according to standard protocols, including dehydration (for example, through a series of graded ethanols), clearing, and embedding in paraffin or another embedding medium (such as araldite, celloidin, Durcupan™, epoxy, glycol methacrylate, hydroxypropyl methacrylate, JB-4™, Spurr, LR White™ polyester, or PEGs). These steps are performed according to standard histological techniques, and can be carried out using an automated tissue processor (such as a Tissue-Tek processor, Sakura Finetek, Torrance, Calif.), manual bench-top processing, or microwave processing. One of ordinary skill in the art can select tissue processing and embedding conditions for particular tissues and desired downstream use with routine experimentation. In some examples, the embedded tissue is sectioned, for use or storage, while in other examples, embedded tissue blocks are placed in storage for later use. In other examples, the fixatives disclosed herein are also suitable for use as a cytology fixative (e.g., without impregnation). For example, following fixation, the sample is moved to alcohol, then smeared or run through a liquid cytology system. Alternatively, cells are smeared onto a slide, which is then dipped in fixative, and subsequently stained.

In additional embodiments, the fixed, embedded tissue or tissue section is utilized for cytology, histomorphologic, flow cytometry or molecular analysis. Thus, in some examples, tissue samples are stained, for example with hematoxylin and eosin (H&E) or other histology stains. In other examples, the tissue samples or sections are utilized for in situ hybridization or immunohistochemistry. In still further examples, nucleic acids (such as RNA or DNA), or protein are extracted from the tissue samples or sections and utilized for analyses such as PCR, RT-PCR, real-time PCR or RT-PCR, quantitative real-time PCR or RT-PCR, microarray analysis, sequencing, Southern blotting, Northern blotting, or Western blotting. Exemplary histomorphologic and molecular analysis methods are described below. One of ordinary skill in the art can select these or other analytical methods suitable to the particular tissue and purpose (such as diagnosis of a particular disease or condition).

EXAMPLES

The following examples are illustrative of disclosed embodiments. In light of this disclosure, those of skill in the art will recognize that variations of these examples and other examples of the disclosed technology would be possible without undue experimentation.

Example 1

Materials and Methods

Fixatives: Six different fixatives were tested: 70% ethanol (E), 70% ethanol+0.5×PBS (EP), 70% ethanol+1% glycerol+0.5×PBS (EGP), 70% ethanol+0.5% glacial acetic acid+0.5×PBS (EAP), 70% ethanol+1% glycerol+0.5% glacial acetic acid+0.5×PBS (EGAP or BE70), and neutral buffered formaldehyde 10% (NBF). The final formulation of fixative was adjusted by volume. Glycerol and glacial acetic acid were purchased from Sigma-Aldrich (St. Louis, Mo.). Ethanol and NBF were purchased from VWR (Radnor, Pa.). 1×PBS was 1.7 mM $KH_2PO_4$, 5 mM $Na_2HPO_4$, 150 mM NaCl, pH 7.4. All fixatives were stored and used at room temperature.

Tissue Samples and Fixation: Mouse specimens were acquired from the National Institutes of Health (NIH), Small Animals Section, Veterinary Resources Branch. The animals were housed and euthanized in accordance with NIH guidelines for care and use of laboratory animals. The ischemia time periods were quite similar (2-3 min) for the different samples. In order to examine the impact of the fixatives in comparison to 10% NBF in antigen degradation and molecular quality, mouse kidney samples were fixed for 24 hours at room temperature in 10 ml of the different fixatives. Tissues were then processed using an enclosed automated processor (Tissue-Tek VIP IV, Sakura Finetek Inc., Torrance, USA) at roughly 30-45 minutes per station. Briefly, tissues were dehydrated in a series of ethanol, then cleared with xylene prior to infiltration with molten paraffin. Tissues were then embedded in paraffin and sectioned for histological and molecular evaluation. Processing has also been carried out in other instruments, including an ethanol/isopropyl/paraffin sequence, with and without microwave. All gave the same results with reference to fixative performance.

Immunohistochemical and Histochemical Evaluation: Immunohistochemical staining was performed on 5 micron thick sections. The tissue sections were deparaffinized through xylene and dehydrated with graded ethanol. Endogenous peroxidase activity was quenched with 3% $H_2O_2$ in water for 10 minutes. Additional blocking to minimize non-specific staining was done with Protein Block solution (Dako, Carpinteria, Calif.) for 15 minutes. After washing with TBST (50 mM Tris, pH 7.5, 150 mM NaCl, 0.05% Tween® 20), the slides were incubated with rabbit anti-aquaporin 1 (AQP1) polyclonal antibodies (Cat. #20810; dilution 1:250; Santa Cruz Biotechnology, Santa Cruz, Calif.) or rabbit anti-CD31 polyclonal antibodies (Cat. #ab28364; dilution 1:50; Abcam, Cambridge, Mass.) for 30 minutes at room temperature. Antigen-antibody reaction was detected using an EnVision™+peroxidase kit and visualized with 3,3-diaminobenzadine (Dako). Slides were then lightly counterstained with hematoxylin, dehydrated in ethanols, cleared in xylene, and coverslipped. Stained slides were observed under a light microscope (Axioplot, Carl Zeiss, Jena, Germany). Hematoxylin and eosin (H&E) stain was done concurrently with each tissue sample to examine histomorphological features. The stained sections were digitized utilizing a NanoZoomer® 2.0 HT slide scanner (Hamamatsu Photonics K.K., Japan) at 40× objective magnification (0.23 µm/pixels resolution).

Protein Extraction and Western Blotting: Protein extraction from two 10 µm formalin fixed paraffin-embedded (FFPE) tissue sections was performed as previously described (Chung et al., *Proteomics Clin. Appl.* 2:1539-1547, 2008). Briefly, sections were trimmed of excess wax and homogenized using a Disposable Pellet Mixer in 200 µl protein extraction solution (1× high pH Antigen retrieval buffer (pH 9.9) (Dako), 1% $NaN_3$, 1% SDS, 10% glycerol and protease inhibitor (1 tablet/25 ml, Roche)), followed by incubation for 15 minutes at 115° C. within a pressure cooker (Dako). After incubation, the tissue lysates were centrifuged at 13,000 rpm for 30 minutes at 4° C. The supernatants were collected and stored at −20° C. Total protein concentrations were measured with the BCA Protein Assay kit (Pierce Biotechnology, Rockford, Ill.).

Ten micrograms of total protein extracted from different fixative solutions were resolved by 4-12% NuPAGE® Bis-Tris polyacrylamide gel (Life Technologies, Grand Island, N.Y.), and transferred to nitrocellulose membrane using iBlot™ Dry Blotting System (Invitrogen, Carlsbad, Calif.). The membranes were blocked with 5% nonfat dry milk in TBST for 1 hour, washed, and subsequently incubated overnight at 4° C. in TBST with mouse anti-GAPDH monoclonal antibodies (clone 6C5; dilution 1:3000; Calbiochem, Gibbstown, N.J.). Specific molecules were detected with horseradish peroxidase-labeled anti-mouse secondary antibodies (Chemicon International, Temecula, Calif.) and enhanced with SuperSignal™ Chemiluminescence kit (Pierce Biotechnology). Signals were detected on BioMax® MR X-ray film (Kodak, Rochester, N.Y.). Quantitative analysis of the western blotting was performed using ImageQuant® software (Ver. 5.2, Molecular Dynamics, Sunnyvale, Calif.).

RNA Extraction and cDNA Synthesis: RNA extraction from two 10 µm tissue sections was performed as described previously (Chung et al., *Diagn. Mol. Pathol.* 15:229-236, 2006). Briefly, sections were trimmed of excess wax and deparaffinized by three incubations in PROTOCOL buffer (Fisher Scientific; Kalamazoo, Mich.) for 15 minutes at 95° C. with shaking, followed by three centrifugations at room temperature for 2 min at 10,000×g. Subsequently, specimens were briefly rinsed once in 100% ethanol. The sections were resuspended and ground in a solution of 4 M guanidine isothiocyanate, 20 mM sodium acetate, and 25 mM β-mercaptoethanol (pH 5.5), followed by incubation for 72 hours at 65° C. with mild shaking. After incubation, RNA was isolated by phenol/chloroform extraction. In order to remove possible contaminating genomic DNA, the extracted RNA was treated with 2 µl TURBO™ DNase buffer, 4 units TURBO™ DNase (Invitrogen, Carlsbad, Calif.) and 40 units of RNase inhibitor (Promega; Madison, Wis.) in a 100 µl reaction volume. The mixture was incubated at 37° C. for 30 minutes, followed by purification with phenol/chloroform extraction. For frozen tissue, total RNA was obtained using TRIzol® reagent (Invitrogen) and further purified with RNeasy® minikits (Qiagen, Valencia, Calif.), according to the manufacturer's instructions (Chung et al., *J. Histochem. Cytochem.* 56:1033-1042, 2008).

Approximately 5 µg of total RNA for each sample was transcribed into complementary DNA (cDNA). Extracted RNA, random hexamers (Promega), and SuperScript® II RT kit (Invitrogen) were used to synthesize the cDNA (Chung et al., *Diagn. Mol. Pathol.* 15:229-236, 2006; Chung et al., *J. Histochem. Cytochem.* 56:1033-1042, 2008). All samples were reverse transcribed under the same conditions. The synthesized cDNA was stored at −20° C. and used as a template in multiplex reverse transcription-polymerase chain reaction (RT-PCR) reactions.

RNA Quantity and Quality: The amount of RNA was determined by using a NanoDrop™ ND-1000 UV spectrophotometer (NanoDrop Technologies, Wilmington, Del.). RNA quality was assessed using a 2100 Bioanalyzer instrument (Agilent Technologies, Palo Alto, Calif.) with the RNA 6000 LabChip® kit (Agilent Technologies). Using the Agilent 2100 expert software (Agilent Technology), RNA integrity number (RIN, Agilent Technologies) was measured. In addition, RNA integrity was assessed by quality metric (QM) number, which is a novel metric for formalin-fixed, paraffin-embedded (FFPE) RNA. This metric is based on a weighed area-under-the-curve approach.

Multiplex RT-PCR: Multiplex RT-PCR was performed using the MPCR kit (Maxim Biotech, San Francisco, Calif.) for mouse tumor necrosis factor (TNF) signaling genes set-3. This kit was designed to detect 9 genes, with amplicons ranging in size from 189 to 658 bp. Multiplex RT-PCR was carried out according to the manufacturer's instructions in a total of 50 µl reaction mixture. An initial pre-PCR step of 96° C. for 5 minutes was performed in the Bio-Rad Icycler® PCR Thermal Cycler (Bio-Rad Lab, Hercules, Calif.), followed by a total of 37 PCR cycles under following condition: 2 cycles of 94° C. for 1 minute and 62° C. for 4 minutes and then 35 cycles of 94° C. for 1 minute and 62° C. for 2 minutes. The final cycle was followed by an additional incubation at 70° C. for 10 minutes to complete partial polymerization. A MPCR positive control (Maxim Biotech) was used in each run. The positive control included mouse frozen kidney RNA. A negative control containing no nucleic acid was also included in each run to check for any PCR cross contamination.

An aliquot (1 µl) of multiplex RT-PCR product was loaded on the DNA 1000 kit (Agilent Technologies, Palo Alto, Calif.) and capillary electrophoresed in the Agilent 2100 Bioanalyzer (Agilent Technologies). Agilent 2100 expert software (Agilent Technologies) was used for comparison of electropherograms.

Real-time Quantitative RT-PCR: After removing the genomic DNA with DNA Eliminator columns (Qiagen), 4 µg of total RNA were reverse transcribed into first-strand cDNA using a QuantiTect® Reverse Transcription kit (Qiagen). cDNA samples were generated from each of three replicates derived from different fixative solutions and frozen mouse kidney RNA and were used for quantitative real-time PCR using TaqMan® Gene Expression reagent (Applied Biosystems). Briefly, quantitative real-time PCR was performed with 2 µg of cDNA assayed in a 20 µl reaction volume. In order to assess RNA integrity, cycle threshold (Ct) value was determined for 18S rRNA and hypoxanthine-guanine phosphoribosyl transferase (HPRT) gene. The experiment was carried out in triplicate. A Mann-Whitney U test was used to evaluate the RNA integrity for each fixative condition.

Assessment of DNA Quantity and Quality: DNA was extracted from a 1-mm tissue core using the QIAamp® DNA FFPE Tissue kit (Qiagen). The extraction was performed according to the manufacturer's instructions. Prior to the final elution step, 40 µl of elution buffer was applied to the column and incubated at room temperature for 2 minutes, followed by centrifugation. The yields of DNA were determined using a NanoDrop™ ND-1000 UV spectrophotometer (NanoDrop Technologies). The DNA quality was assessed using a BioScore™ Screening and Amplification kit (Enzo Life Sciences, Farmingdale, N.Y.) (Chung et al., *Anal. Biochem.* 425:128-134, 2012). In addition, real-time PCR using TaqMan® Gene Expression reagent (Applied Biosystems) was performed. Briefly, quantitative real time PCR was performed with 1 µg of DNA assayed in a 20 µl reaction volume. The reactions were incubated for 2 minutes at 50° C., for 10 minutes at 95° C. for initial denaturing and followed by 50 cycles of 95° C. for 15 seconds and 60° C. for 1 minute in ABI 7500 real-time PCR system (Applied Biosystems). In order to assess DNA integrity, Ct value for HPRT gene was determined. The experiment was carried out in triplicate. A Mann-Whitney U test was used to evaluate the DNA integrity for each fixative condition.

Example 2

Histomorphology

This example describes histomorpholgic features of samples processed with fixatives containing 70% ethanol, compared to NBF.

Fixatives are applied to mediate preservation of tissue, however in their application for histopathology, the goal is retention of cyto- and histo-morphologic features. FIG. 1 demonstrates the histomorphologic features of tissue, with neutral buffered formalin (NBF) as the reference fixative, and the derivative fixatives of different combinations of 70% ethanol, PBS-buffered ethanol, and formulations containing glacial acetic acid and glycerol. 70% ethanol resulted in greater shrinkage with poorer cytologic features, compared to NBF. The introduction of PBS as a buffering solution offset these changes, with less shrinkages and greater cytologic detail.

Phosphate-buffered ethanol fixatives were also tested in comparison to PBS buffered ethanol. Without being bound by theory, the presence of saline in the fixative appeared to contribute to cytomorphology quality, possibly by exerting osmotic effects. These differences appeared to result in less cell and overall tissue shrinkage.

Example 3

Immunohistochemical Staining

This example describes evaluation of immunohistochemical staining of samples processed with fixatives containing 70% ethanol, compared to NBF.

Immunohistochemistry is very susceptible to differences in pre-analytic variables, including fixation time and fixative type. The application of antigen retrieval was originally performed to improve detection of antigens in formalin fixed tissues by linearization of peptides, and chemical hydrolysis of protein-protein crosslinks, however it is now applied across preservation methods. Generally, tissues fixed with non-crosslinking fixatives require less antigen retrieval.

Figure 2:
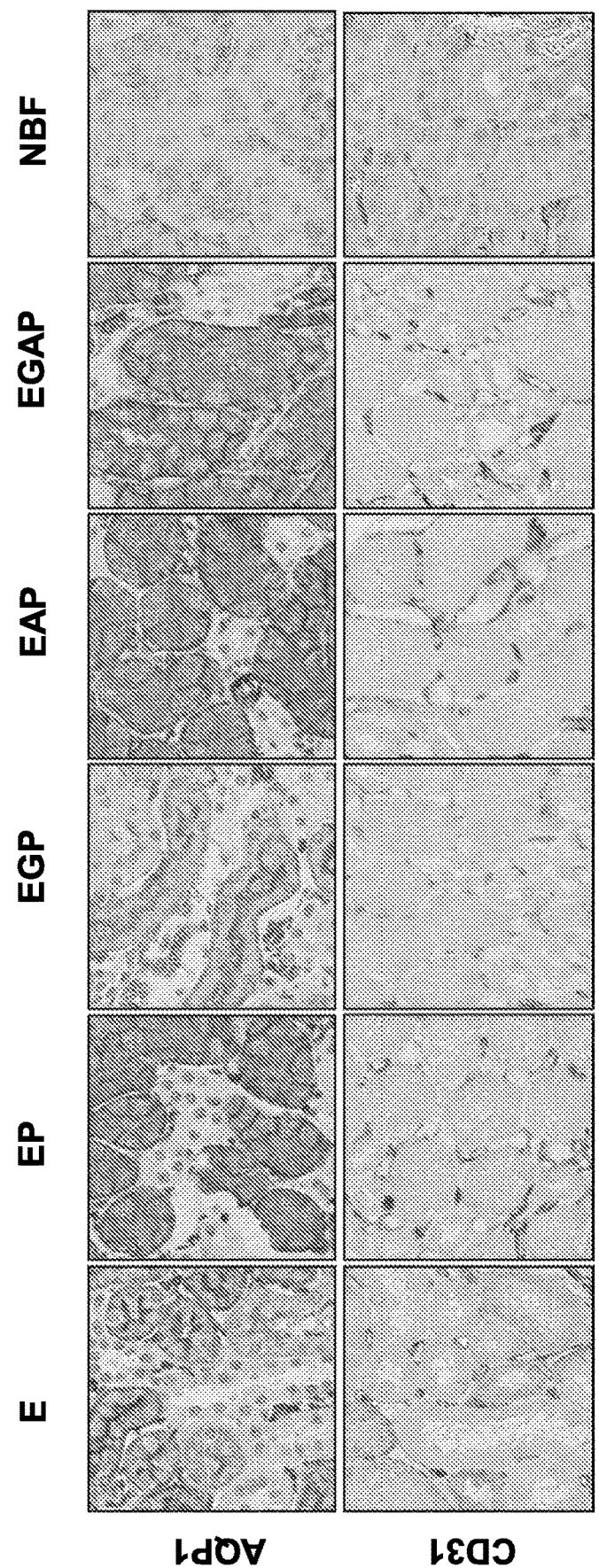
FIG. 2 is a series of digital images of photomicrographs of representative immunohistochemical images of AQP1 and CD31 staining of sections from mouse kidney tissue blocks after fixation with the indicated fixative and paraffin embedding.

FIG. 2 demonstrates immunohistochemistry for AQP1 and CD31 in mouse kidney tissue sections. The staining pattern observed was optimized for EGAP fixation, and demonstrated the staining results under these conditions for the other fixatives in the ethanol series, as well as NBF.

Example 4

Protein Quantity and Quality

This example describes evaluation of protein quality and quantity obtained from samples processed with fixatives containing 70% ethanol, compared to NBF.

Figure 3A:
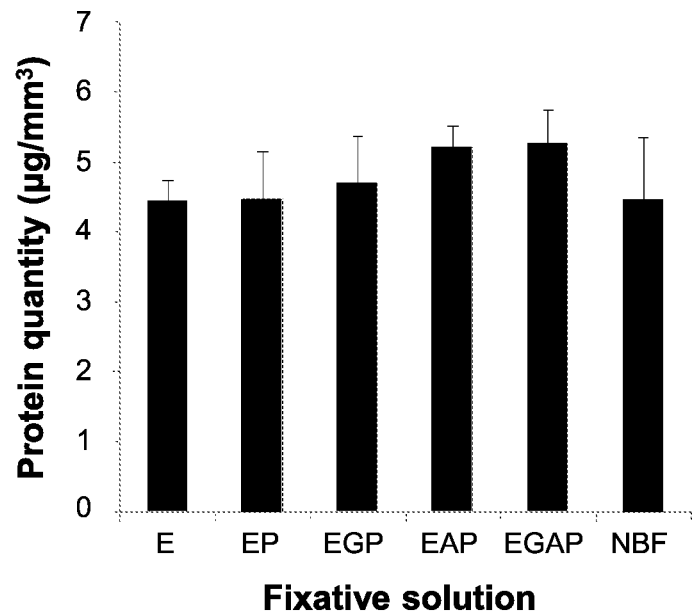
FIGS. 3A and 3B are a pair of graphs showing protein quantity and quality obtained after mouse kidney fixation with the indicated fixative and paraffin embedding.

Proteins were extracted from mouse kidney tissues fixed with the different ethanol fixative formulations or NBF fixative, and subjected to Western blotting employing anti-GAPDH antibodies. NBF fixed mouse kidney tissue was used as a negative control. Although the protein extraction yield of EGAP fixative showed the highest amount (5.25±0.490 µg/mm$^3$) among tested fixatives (FIG. 3A), there was no statistically meaningful difference between the different fixatives tested (4.42-5.25±0.918 µg/mm$^3$).

Figure 3B:
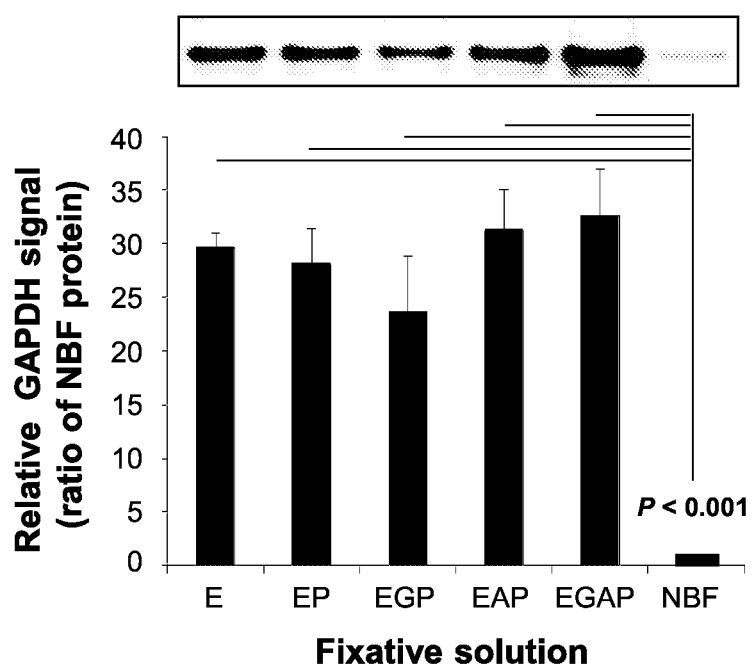

The quality of protein extracted from the ethanol fixative formulations and NBF fixed tissues was determined by Western blotting. The quantitative image analyses of Western blot intensities were evaluated by a Mann-Whitney U test. As shown in FIG. 3B, the GAPDH signal was more strongly detected in the various ethanol fixed tissue samples (all p<0.001) than in NBF fixed tissue samples. In particular, GAPDH was better preserved in EGAP-fixed tissue (approximately 32.6-fold increase) than in NBF fixed tissue, whereas EGP fixative (approximately 23.7-fold increase) showed the lowest signals among tested ethanol fixatives. However, there was no statistically meaningful difference between the EGAP and the EGP fixative. These results suggest that the ethanol fixative formulations provide significant advantages in protein quality over NBF, but did not significantly impact the amount of protein recovered.

Example 5

RNA Quantity and Quality

This example describes evaluation of RNA quality and quantity obtained from samples processed with fixatives containing 70% ethanol, compared to NBF.

Figure 4A:
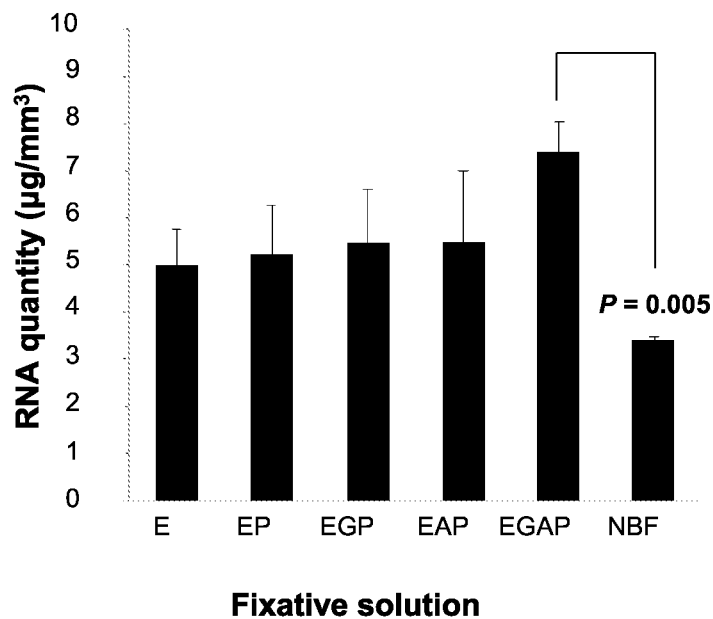
FIGS. 4A-4C are a series of panels showing RNA quantity and quality obtained after mouse kidney fixation with the indicated fixative and paraffin embedding.

RNA was extracted from mouse kidneys that were fixed with the different fixatives under investigation and impregnated with paraffin. The quantity of RNA was assessed by UV spectrophotometry. Compared to NBF (mean 3.32±0.15 µg/mm$^3$), EGAP (mean 7.35±0.69 µg/mm$^3$) showed a significant effect on RNA recovery (P=0.005) (FIG. 4A). The 260/280 ratio of EGAP (mean 2.01) was similar to NBF (mean 1.89).

Figure 4B:
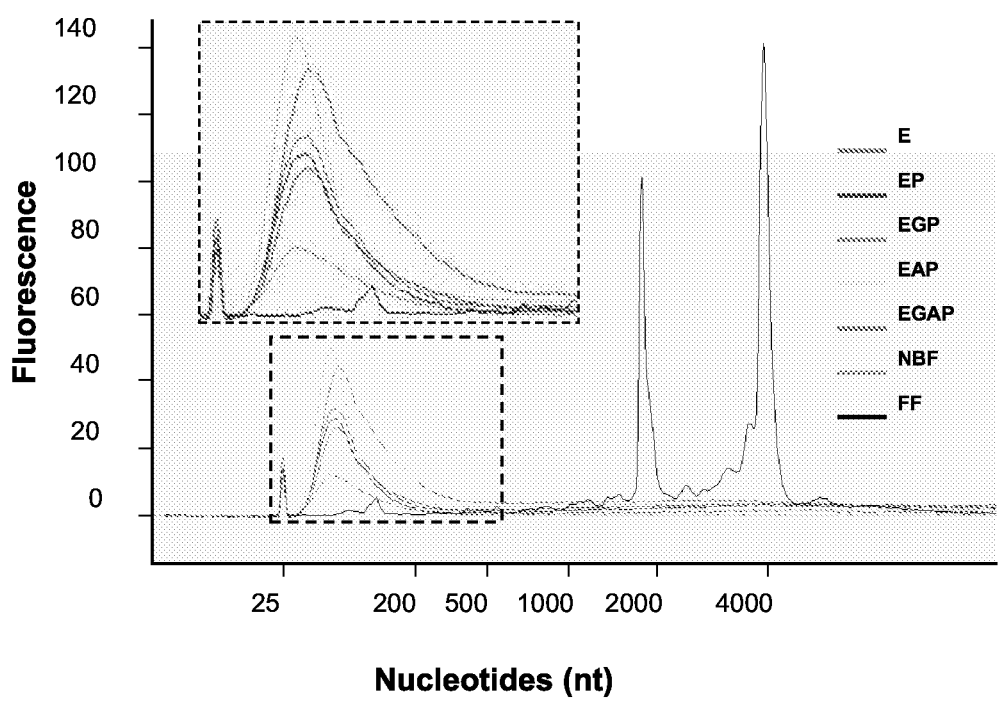

Next, the quality of RNA extracted was analyzed by the 2100 Bioanalyzer instrument (Agilent Technologies, Palo Alto, Calif.). Although the recovery of RNA from the EGAP fixative showed the highest quantity, the electropherogram demonstrated that the RNA had limited lengths (FIG. 4B). The pattern observed from FFPE tissue demonstrated shorter fragments between 100 and 200 nucleotides in length. In comparison, EGAP and the other ethanol fixatives showed increased RNA fragment length, supporting the finding that EGAP fixative preserved higher quality of RNA than NBF.

The Ribosomal Integrity Number (RIN), which is the 28S to 18S rRNA, ratio has been widely adopted as a measure of RNA quality for RNA isolated from fresh and frozen tissue. The RIN remains an imperfect measure of quality, lacks strong correlation with gene-specific measurements (Schroeder et al., *BMC Mol. Biol.* 7:3, 2006), and cannot be accurately applied to RNA isolated from formalin fixed, paraffin embedded tissue (Chung et al., *J. Histochem. Cytochem.* 0.56:1033-1042, 2008). In this context, we developed a quality metric (PERM—Paraffin embedded RNA Metric) number which is a novel metric for FFPE RNA. This metric is based on a weighed area-under-the-curve approach. Briefly, starting from an electropherogram (for example created by an Agilent 2100 Bioanalyzer) or other methods of quantifying RNA fragment length (such as densitometry of an image of gel electrophoresis), a simple calculation based on fluorescent units at specific time points was used to qualify RNA integrity. The PERM provides a metric that places progressively greater value on the length of RNA in the calculated metric. The metric is calculated as follows:

$$QM = FU_{25} + (2*FU_{30}) + (3*FU_{35}) + (4*FU_{40}) + (5*FU_{45}) + (6*FU_{50}) + (7*FU_{55}) + (8*FU_{60}) + (9*FU_{65})$$

where $FU_n$ is fluorescence units at the indicated number of seconds.

Figure 4C:
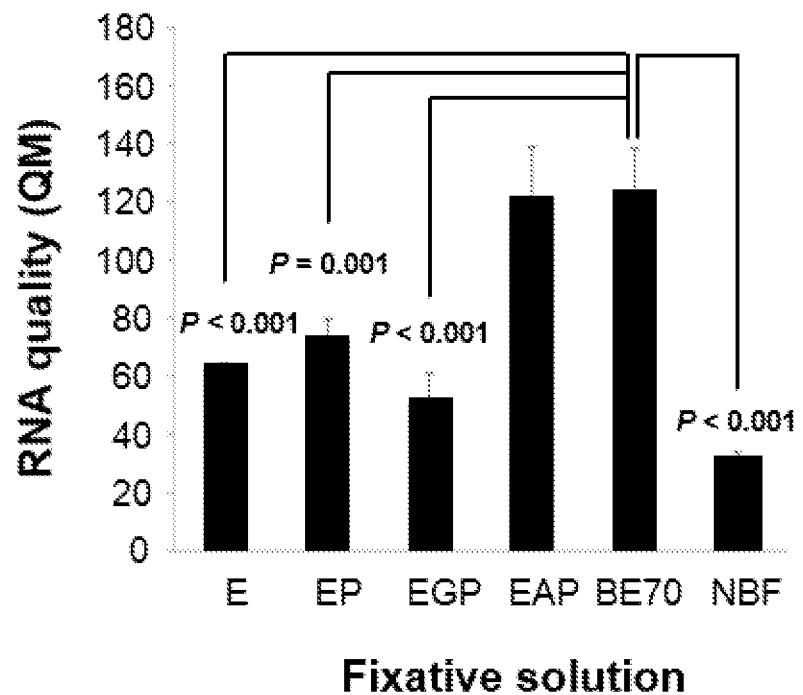

As shown in FIG. 4C, the impact of individual components of the ethanol-based fixatives on RNA quality can be dissected. The EGAP (BE70) fixative (mean PERM 123.40) and EAP fixative (mean PERM 121.23) showed the highest numbers. The effect of PBS and glycerol addition on this particular metric was minimal. NBF showed the lowest number (mean PERM 32.02) among those of the tested fixative conditions (FIG. 4C).

Figure 5A:
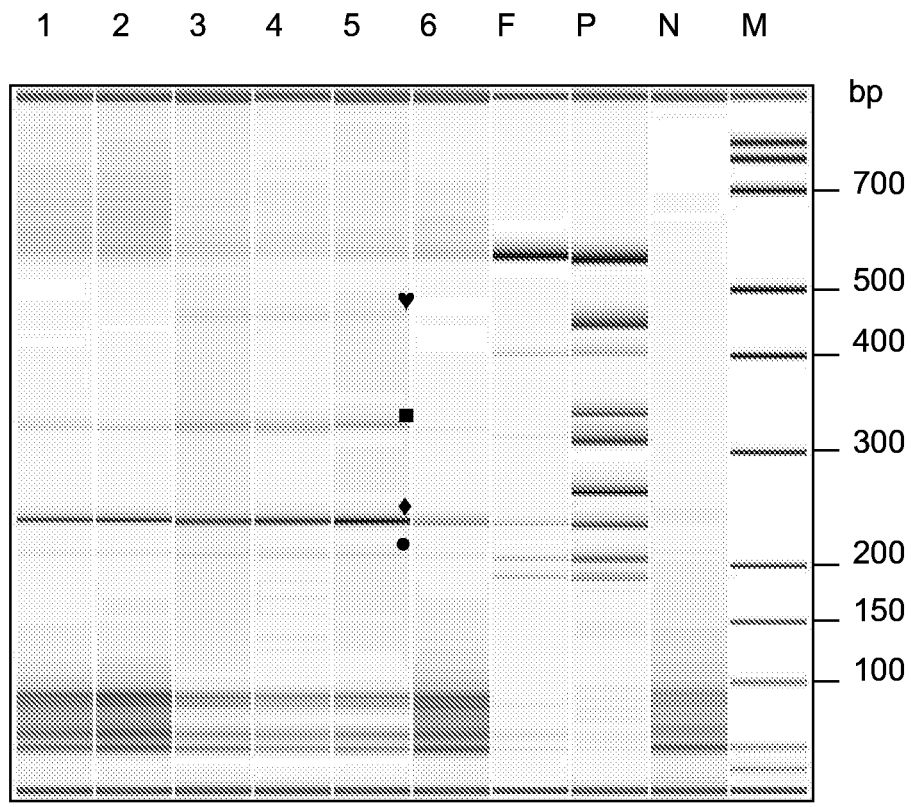
FIGS. 5A-5D are a series of panels showing RNA integrity profile of RNA samples derived from mouse kidney tissues, fixed with the indicated fixative and paraffin embedded. The gene expression profile of tumor necrosis factor signaling genes was analyzed by multiplex reverse transcription-polymerase reaction (RT-PCR) using the MPCR kit (Maxim Biotech). An aliquot (1 µl) of the PCR reaction was run on the Agilent 2100 Bioanalyzer using DNA 1000 chip. Representative data are shown as a gel-like image (FIG. 5A) and an electropherogram (FIG. 5B). Fixative conditions of each sample in FIG. 5A are indicated above each lane as follows: 1, E; 2, EP; 3, EGP; 4, EAP; 5, EGAP; 6, NBF; F, fresh frozen mouse kidney; P, positive control; N, negative control (water); M, molecular weight marker. To compare the quality of PCR amplicons.
Figure 5B:
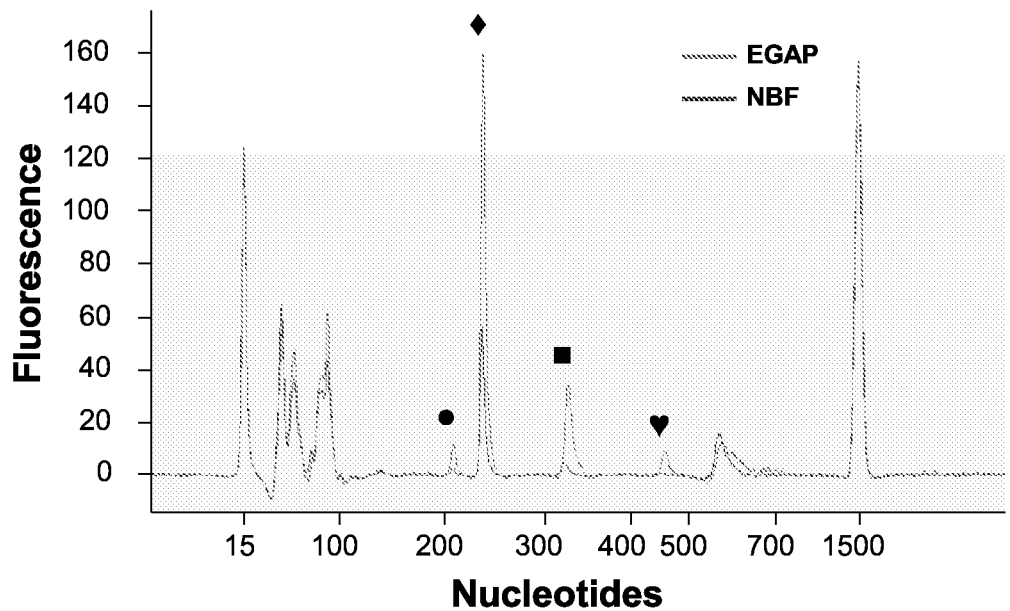

To further evaluate the quality of RNA extracted, RT-PCR with a small size amplicon (usually from 100 to 150 bp) was tested. To evaluate the size limitation of amplicon of RNA extracted from tissue fixed with the panel of fixatives and paraffin impregnated, multiplex RT-PCR using the MPCR kit for mouse TNF signaling genes set-3 was used. Four bands (205, 235, 316, and 449 bp) that corresponded with the exact sizes of the targets in ethanol fixatives were identified in the ethanol-fixed tissues, whereas two bands (235 and 316 bp) were detected in NBF fixed tissues with relatively weak signal (FIGS. 5A and 5B).

Figure 5C:
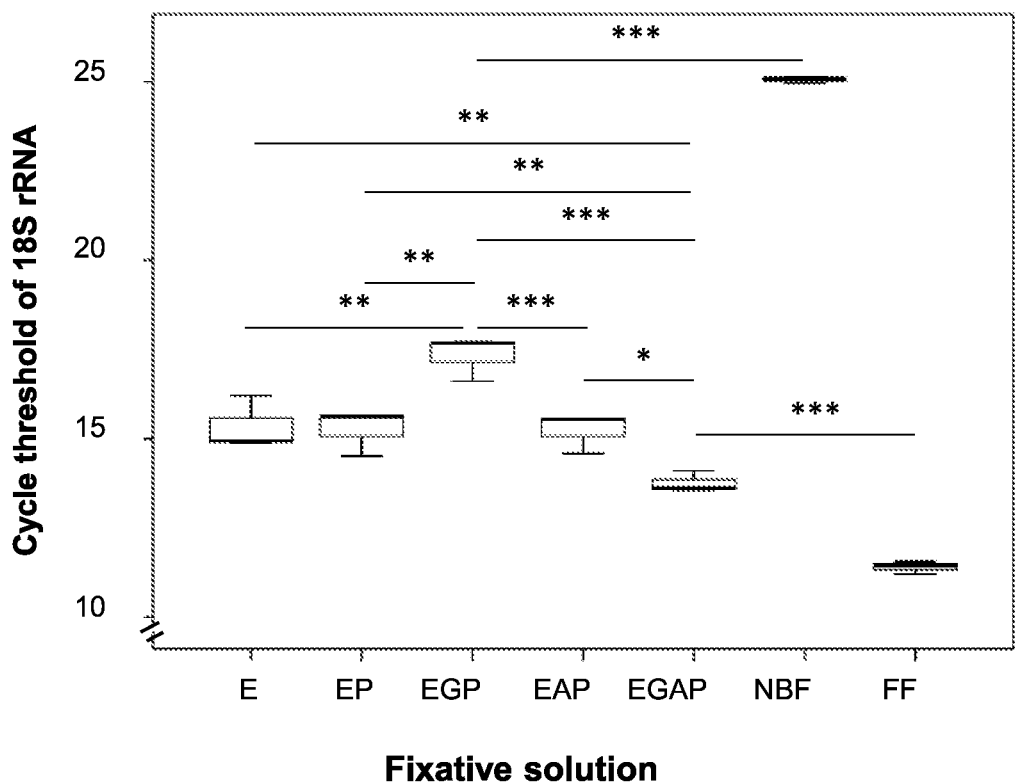
Figure 5D:
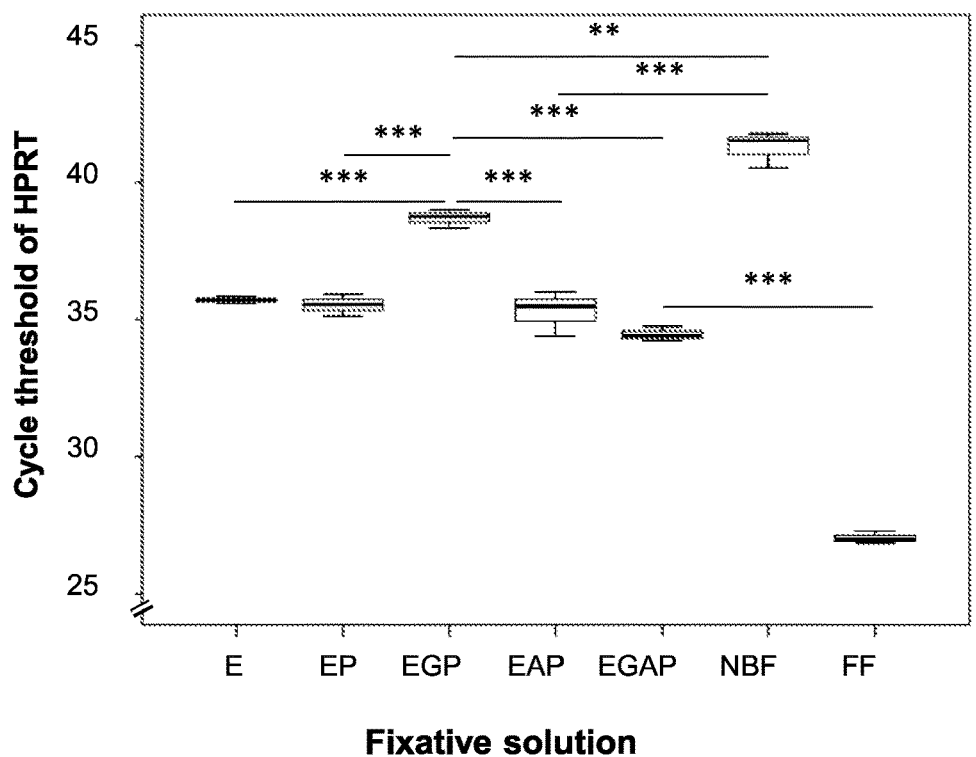

The effect of fixatives on RNA integrity was also evaluated by real-time quantitative RT-PCR using 18S rRNA and HPRT primers. Endogenous control 18S rRNA generally showed low Ct-values (FIG. 5C), whereas HPRT gene showed high Ct-values (FIG. 5D). The Ct-value of the qRT-PCR amplifications were 11.40 for 18S rRNA and 27.06 for HPRT in preparations from fresh frozen (FF) tissues. Among the tested fixatives, EGAP resulted in Ct-values of 13.76 for 18S rRNA and 34.46 for HPRT, whereas EGP was demonstrated Ct values of 17.33 for 18S rRNA and 38.69 for HPRT. In contrast, in samples generated from FFPE tissue the Ct-values were higher, mean 25.06 and 41.27 for 18S rRNA and HPRT, respectively. It is clearly visible that the Ct-value of the EGAP was the lowest among all fixed samples, with 70% ethanol alone, EP and EAP showing similar (though slightly higher) values (FIGS. 5C and 5D).

Example 5

DNA Quantity and Quality

This example describes evaluation of DNA quality and quantity obtained from samples processed with fixatives containing 70% ethanol, compared to NBF.

Figure 6A:
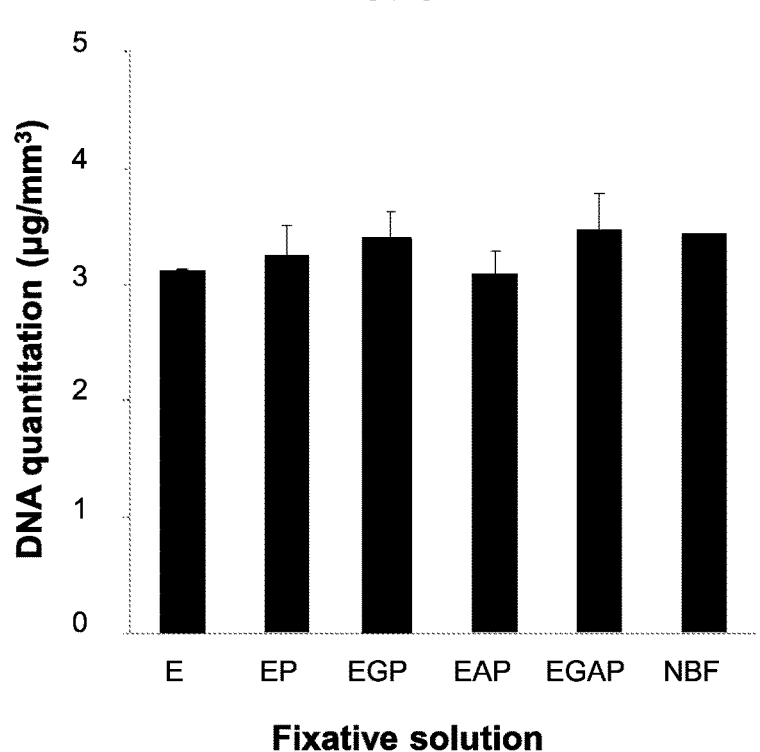
FIGS. 6A-6C are a series of panels showing DNA quantity and quality obtained from mouse kidney fixed with the indicated fixative solutions and embedded in paraffin.
Figure 6B:
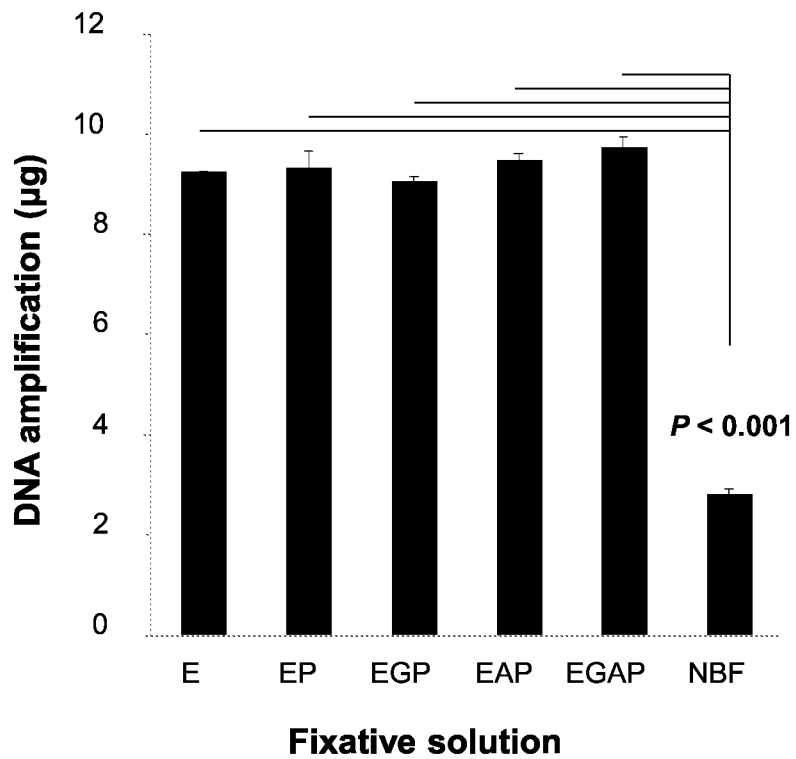

DNA was successfully extracted from all fixed tissues. The DNA extraction yield of EGAP was similar to that of NBF (mean 1.09-fold) (FIG. 6A). The 260/280 ratio of EGAP (mean 1.86) was also similar to NBF (mean 1.80). In addition, DNA obtained from evaluated fixed tissues was tested for array analysis suitability using BioScore™ Screening and Amplification Kit (Enzo Life Sciences, Farmingdale, N.Y.; Chung et al., *Anal. Biochem.* 425:128-134, 2012). Using a 100 ng DNA template extracted from each of the ethanol-fixed tissues, approximately 9.73±0.23 µg of DNA of good quality was amplified for nucleic acid array analysis. However, the DNA prepared from NBF fixed tissue showed intermediate quality (mean 2.81±0.13 µg) for the microarray application (FIG. 6B).

Figure 6C:
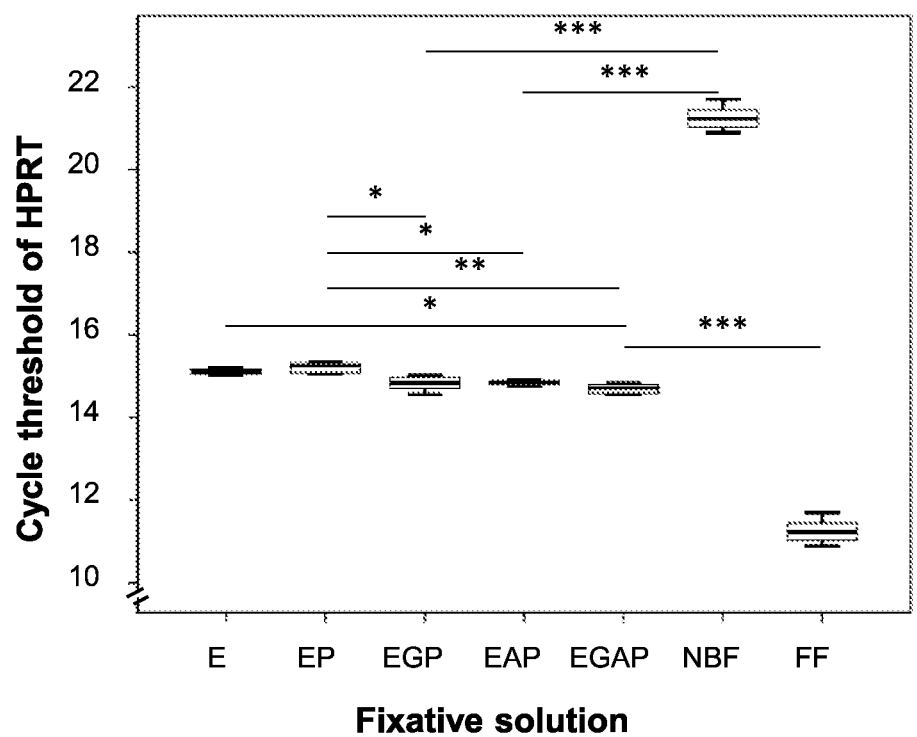

To evaluate the impact of different fixatives on DNA integrity, real-time PCR using HPRT primers was carried out. As shown in FIG. 6C, Ct-value of EGAP fixed tissue (mean Ct 14.70) was lower than that of NBF (mean Ct 21.25). In addition, the Ct value of EGAP fixed tissue was similar to 70% ethanol as a fixative (mean Ct 15.11). As expected, the Ct value of fresh frozen (mean Ct 11.25) tissue was lower than that of ethanol-fixed or NBF-fixed tissue (FIG. 6C).

Example 6

Varying Fixative Component Concentrations

This Example describes fixatives with 70% ethanol and varying amounts of PBS, glycerol, and acetic acid.

Fixative formulations including 70% ethanol, 0.2-1×PBS, 1-5% glycerol, and 0-10% glacial acetic acid. Tables 2-4 show the compositions produced. Compositions that did not precipitate were tested by fixing tissue and evaluating tissue staining (H&E), quality of RNA (by PCR and/or QM), and immunohistochemistry.

TABLE 2

Fixatives with 70% ethanol, 0.5X PBS and varying glycerol and acetic acid

| EtOH (%) | PBS (X) | Glycerol (%) | Glacial Acetic Acid (%) | starting pH | Comments | 4° C. O/N | Room Temp | 10N NaOH (μL) | Final pH | Comments | 4° C. O/N | Room Temp |
|---|---|---|---|---|---|---|---|---|---|---|---|---|
| 70 | 0.5 | 1 | 0 | 8.1 | soln. cloudy @ RT before acetic acid was added | precipitant | precipitant | | <8 but >7 | pH change after 4° but precipitant still remains | no | |
| 70 | 0.5 | 2 | 0 | 8.12 | soln. cloudy @ RT before acetic acid was added | precipitant | precipitant | | <8 but >7 | pH change after 4° but precipitant still remains | no | |
| 70 | 0.5 | 5 | 0 | 8.15 | soln. cloudy @ RT before acetic acid was added | precipitant | precipitant | | <8 but >7 | pH change after 4° but precipitant still remains | no | |
| 70 | 0.5 | 1 | 1 | 4.45 | soln. cloudy @ RT before acetic acid was added | no precipitant | no precipitant | ~350 | 7.02 | | soln remain clear | precipitant |
| 70 | 0.5 | 1 | 2.5 | 4.09 | soln. cloudy @ RT before acetic acid was added | no precipitant | no precipitant | >900 | 7 | | soln remain clear | precipitant |
| 70 | 0.5 | 1 | 5 | 3.81 | soln. cloudy @ RT before acetic acid was added | no precipitant | no precipitant | >1000 | | vol. of NaOH >1 ml, no further testing needed | | |
| 70 | 0.5 | 1 | 10 | 3.45 | soln. cloudy @ RT before acetic acid was added; glycerol droplets present | no precipitant | no precipitant | >1000 | | vol. of NaOH >1 ml, no further testing needed | | |
| 70 | 0.5 | 2 | 1 | 4.47 | soln. cloudy @ RT before acetic acid was added | no precipitant | no precipitant | <1000 | 7.03 | | precipitant | precipitant |
| 70 | 0.5 | 2 | 2.5 | 4.08 | soln. cloudy @ RT before acetic acid was added | no precipitant | no precipitant | >1000 | 7.05 | | soln remain clear | no precipitant |
| 70 | 0.5 | 2 | 5 | 3.78 | soln. cloudy @ RT before acetic acid was added | no precipitant | no precipitant | | | vol. of NaOH >1 ml, no further testing needed | | |
| 70 | 0.5 | 2 | 10 | 3.44 | soln. cloudy @ RT before acetic acid was added; glycerol droplets present | no precipitant | no precipitant | | | vol. of NaOH >1 ml, no further testing needed | | |

TABLE 2-continued

Fixatives with 70% ethanol, 0.5X PBS and varying glycerol and acetic acid

| EtOH (%) | PBS (X) | Glycerol (%) | Glacial Acetic Acid (%) | starting pH | Comments | 4° C. O/N | Room Temp | 10N NaOH (μL) | Final pH | Comments | 4° C. O/N | Room Temp |
|---|---|---|---|---|---|---|---|---|---|---|---|---|
| 70 | 0.5 | 5 | 1 | 4.41 | soln. cloudy @ RT before acetic acid was added | no precipitant | no precipitant | | 7.1 | | soln remain clear | little precipitant |
| 70 | 0.5 | 5 | 2.5 | 4.23 | soln. cloudy @ RT before acetic acid was added | no precipitant | no precipitant | >1000 | 7.01 | | soln remain clear | no precipitant |
| 70 | 0.5 | 5 | 5 | 3.75 | soln. cloudy @ RT before acetic acid was added; glycerol droplets present | no precipitant | no precipitant | | | vol. of NaOH >1 ml, no further testing needed | | |
| 70 | 0.5 | 5 | 10 | 3.41 | soln. cloudy @ RT before acetic acid was added; glycerol droplets present | no precipitant | no precipitant | | | vol. of NaOH >1 ml, no further testing needed | | |

TABLE 3

Fixatives with 70% ethanol and varying PBS, glycerol, and acetic acid (total volume 100 ml)

| EtOH (%) | PBS | Glycerol | starting pH | Glacial Acetic Acid (μL) | pH | 4° C. O/N | Heat @ 65° C. (~1-1.5 hr) | Glacial Acetic Acid (μL) | pH | 10N NaOH pH | 4° C. O/N |
|---|---|---|---|---|---|---|---|---|---|---|---|
| 70 | 1X | 1% | 7.67 | 120 | 4.84 | no precipitant | no | 0 | 4.88 | 5.10 | no precipitant |
| 70 | 1X | 2% | 7.68 | 120 | 4.88 | no precipitant | no | 0 | 4.85 | 5.07 | no precipitant |
| 70 | 1X | 5% | 7.71 | 120 | 4.89 | no precipitant | no | 0 | 4.87 | 5.03 | no precipitant |
| 70 | 0.5X | 1% | 8.10 | 100 | 4.8 | no precipitant | no | 0 | 4.77 | 5.10 | no precipitant |
| 70 | 0.5X | 2% | 8.10 | 100 | 4.77 | no precipitant | no | 0 | 4.75 | 5.02 | no precipitant |
| 70 | 0.5X | 5% | 8.11 | 100 | 4.72 | no precipitant | no | 0 | 4.78 | 5.00 | no precipitant |
| 70 | 0.29X | 1% | 8.48 | 0 | | precipitant | Glycerol present | 40 | 4.95 | 5.07 | no precipitant |
| 70 | 0.28X | 2% | 8.47 | 0 | | precipitant | Glycerol present | 40 | 4.93 | 5.05 | no precipitant |
| 70 | 0.25X | 5% | 8.45 | 0 | | precipitant | Glycerol present | 30 | 5.05 | 0.00 | no precipitant |

TABLE 4

Fixatives with 70% ethanol, 0.5X PBS, 5% glycerol, and varying acetic acid (total volume 100 ml)

| EtOH | PBS | Glycerol | starting pH | Glacial Acetic Acid (µL) | pH | 10N NaOH (µL) | pH | 4° C. O/N | Comments |
|---|---|---|---|---|---|---|---|---|---|
| 70% | 0.5X | 5% | 8.21 | 100 | 5.12 | 0 | 5.12 | no precipitant | no precipitant @ RT |
| 70% | 0.5X | 5% | 8.25 | 500 | 4.44 | ~80 | 5.00 | no precipitant | no precipitant @ RT |
| 70% | 0.5X | 5% | 8.22 | 1000 | 4.13 | ~120 | 5.01 | no precipitant | no precipitant @ RT |
| 70% | 0.5X | 5% | 8.20 | 1500 | 3.95 | ~230 | 5.01 | no precipitant | no precipitant @ RT |

Example 7

Effect of Fixation Time with BE70

This example compares the effect of length of fixation of tissue in BE70 and NBF on histomorphology, IHC, Western blotting, and protein recovery.

Mouse, liver and kidney tissue was fixed in BE70 or NBF for varying amounts of time from 4 hours to 6 months to determine performance of histology, IHC, Western blotting, and protein recovery at various time points.

Figure 7A:
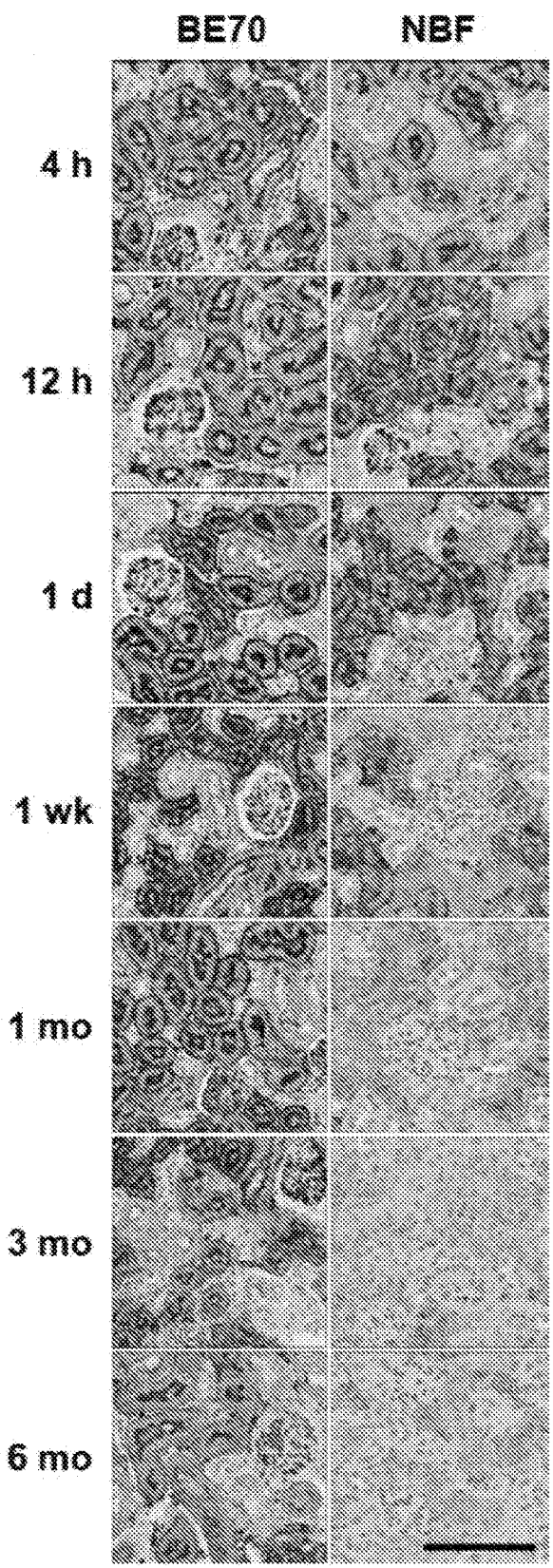
FIGS. 7A and 7B are a series of panels showing immunohistochemistry of mouse kidney and mouse spleen, respectively, fixed with BE70 or NBF for the indicated amounts of time.
Figure 7B:
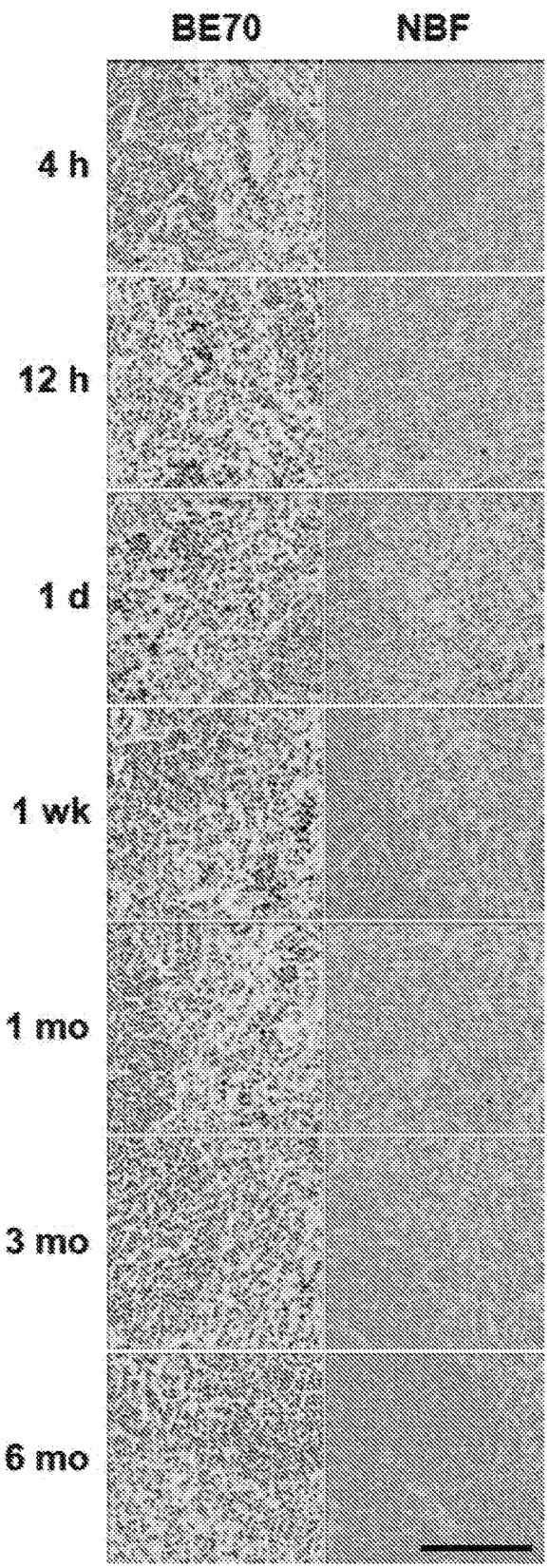
Figure 8A:
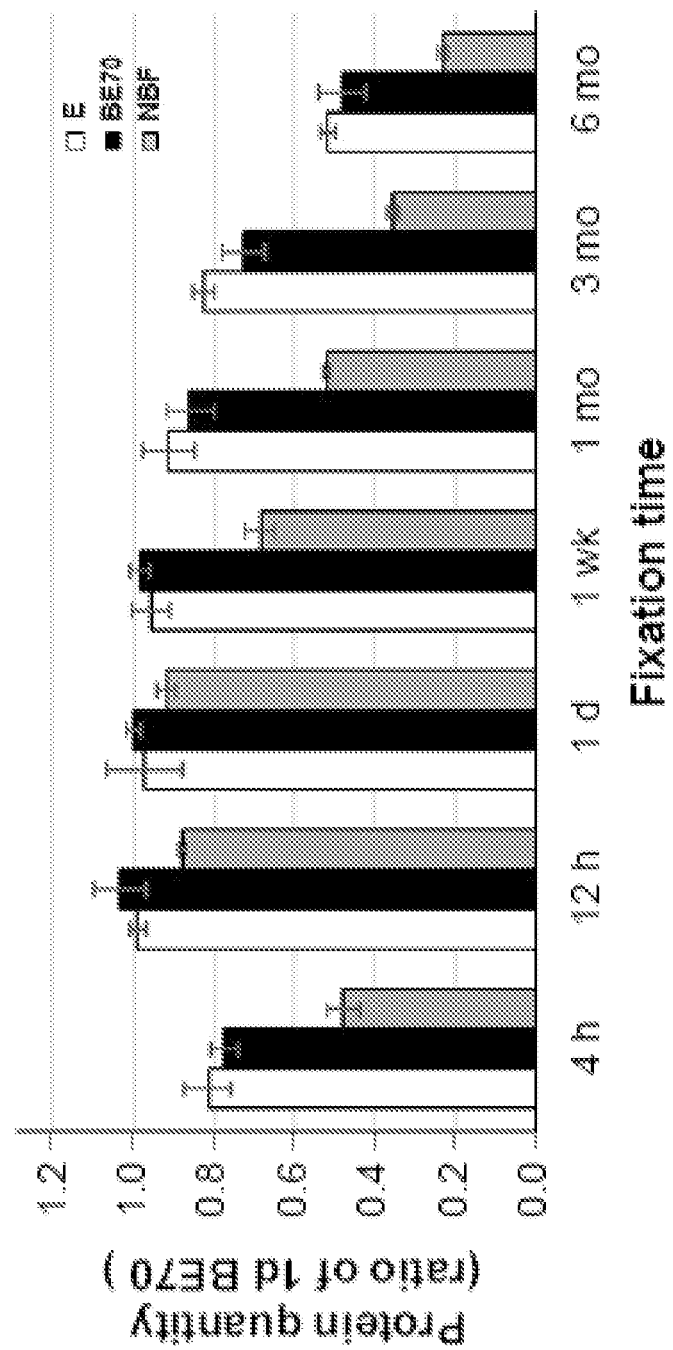
FIGS. 8A-8C are a series of panels showing protein quantity and western blotting in kidney tissue fixed with BE70 or NBF for the indicated amounts of time.
Figure 8B:
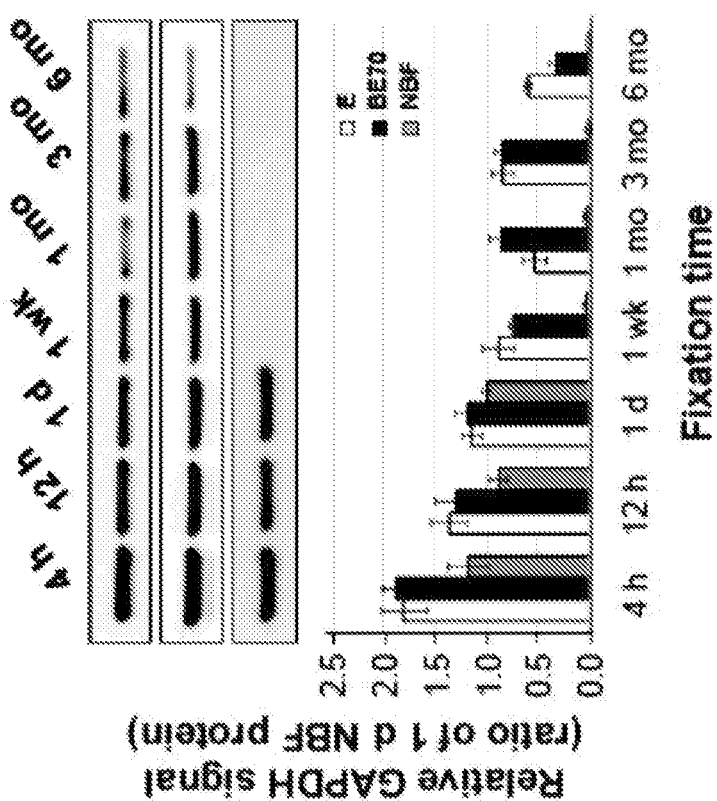
Figure 8C:
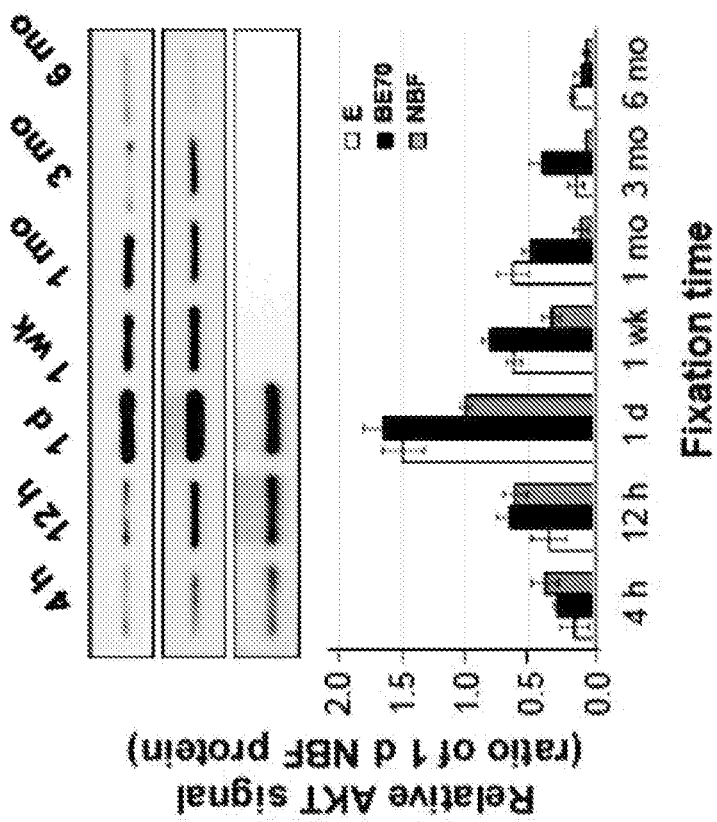

IHC of mouse kidney tissue with Aquaporin (FIG. 7A) or Ki-67 (FIG. 7B) showed that BE70 fixation provides adequate quality at 4 hours of fixation and this is retained to at least 3 months fixation. In contrast, fixation with NBF only provides adequate quality from about 1 day to 1 week. Protein recovery (FIG. 8A) and Western blotting (FIGS. 8B and 8C) was generally best with BE70 fixation for about 12 hours to one month. NBF fixation was generally best for Western blotting at 12 hours to 1 day.

Figure 9:
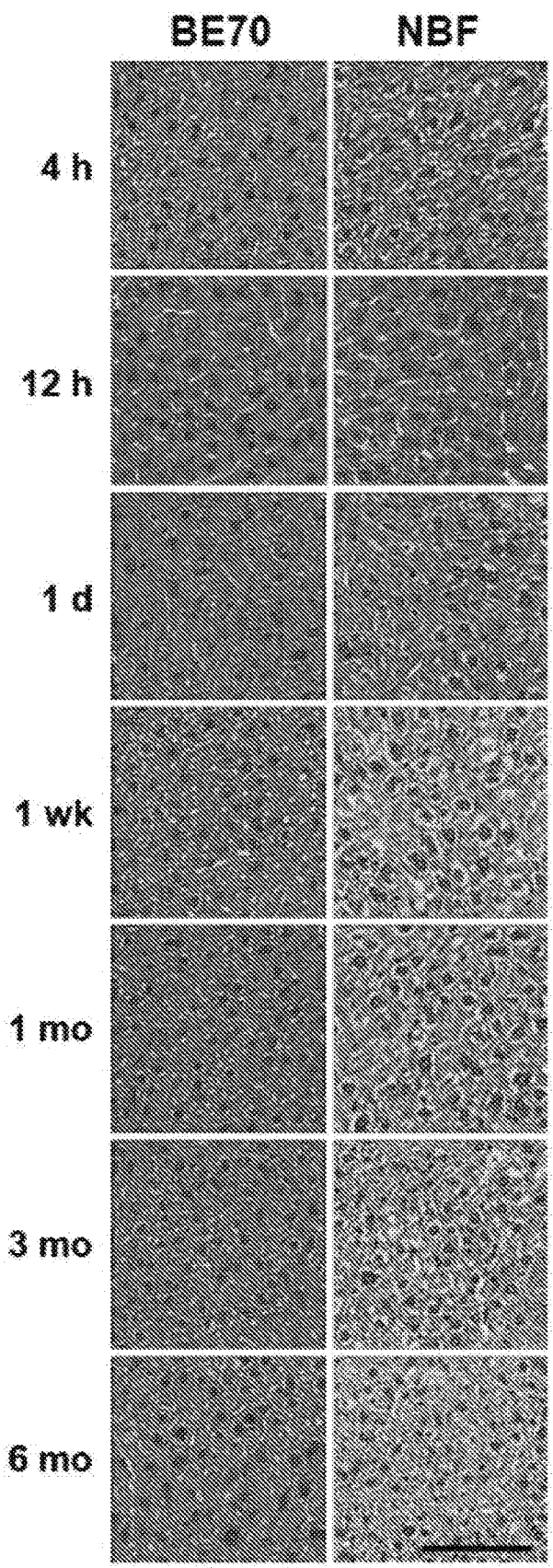
FIG. 9 is a series of panels showing H&E staining of mouse liver tissue fixed with BE70 or NBF for the indicated amounts of time.

Finally, histomorphology (H&E staining; FIG. 9) was evaluated for BE70 and NBF at various times. BE70 provided good results from at least 12 hours to 6 months fixation, and was only slightly less effective than NBF at 4 hours. In contrast NBF fixation was inadequate at 4 hours, adequate for 12 hours to 1 day, and dropped out by 1 week.

Example 8

BE70 Fixative with Guanidinium Salts

This example describes the effect of adding guanidinium salts to the BE70 fixative.

BE70 solutions (70% ethanol (v/v), 0.5×PBS (v/v), 1% glycerol (v/v), and 0.5% glacial acetic acid (v/v)) were prepared as described above, with the addition of guanidinium salts. Guanidine HCl was added at a final concentration of 0.8 M or 1.6 M. Guanidine thiocyanate (GT) was added at 0.51 M, 1.02 M, or 1.69 M. Guanidine acetate salt (GAS) was added at 0.84M GAS (I) and 0.42M GAS (II). Mouse liver and kidney tissue samples were collected. In order to examine the impact of the fixatives in comparison to 10% NBF in antigen degradation and molecular quality, mouse kidney samples were fixed for 24 hours at room temperature in 10 ml of the different fixatives. Tissues were then processed using an enclosed automated processor (Tissue-Tek VIP IV, Sakura Finetek Inc., Torrance, USA) at roughly 30-45 minutes per station. Briefly, tissues were dehydrated in a series of ethanol, then cleared with xylene prior to infiltration with molten paraffin. Tissues were then embedded in paraffin and sectioned for histological and molecular evaluation. Molecular evaluation was performed as described in Example 1.

Figure 10:
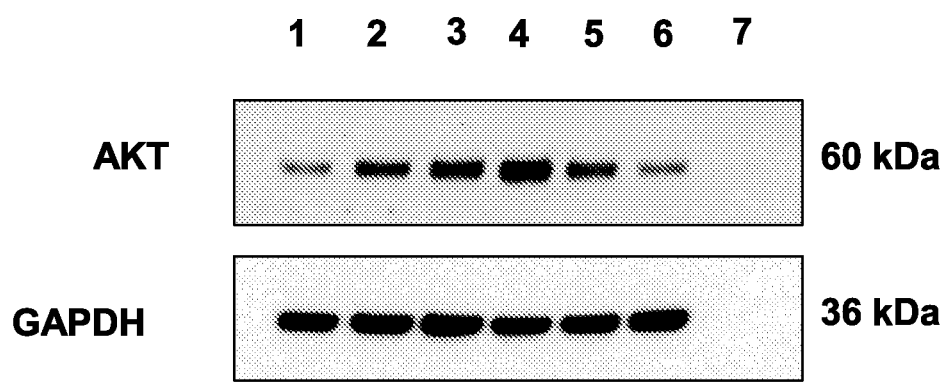
FIG. 10 is a digital image of a western blot for AKT and GAPDH in kidney tissue fixed with the indicated fixative for 24 hours.

Western blotting of kidney tissue fixed with BE70 plus guanidine HCl or GT showed improved detection of AKT compared to BE70 alone or NBF (FIG. 10). BE70+GT appeared to be superior to BE70+guanidine HCl. This is supported by additional data below.

The paraffin embedded RNA metric (PERM, previously referred to as Quality Metric) was evaluation for BE70+GT. The PERM is a measure or RNA quality applied to paraffin embedded tissue, that has high (0.9) correlation with gene specific metrics (see, e.g., Chung et al., *Biotechniques.* 60(5):239-44, 2016). The BE70+GT solutions demonstrated superior performance (FIG. 11).

Figure 12A:
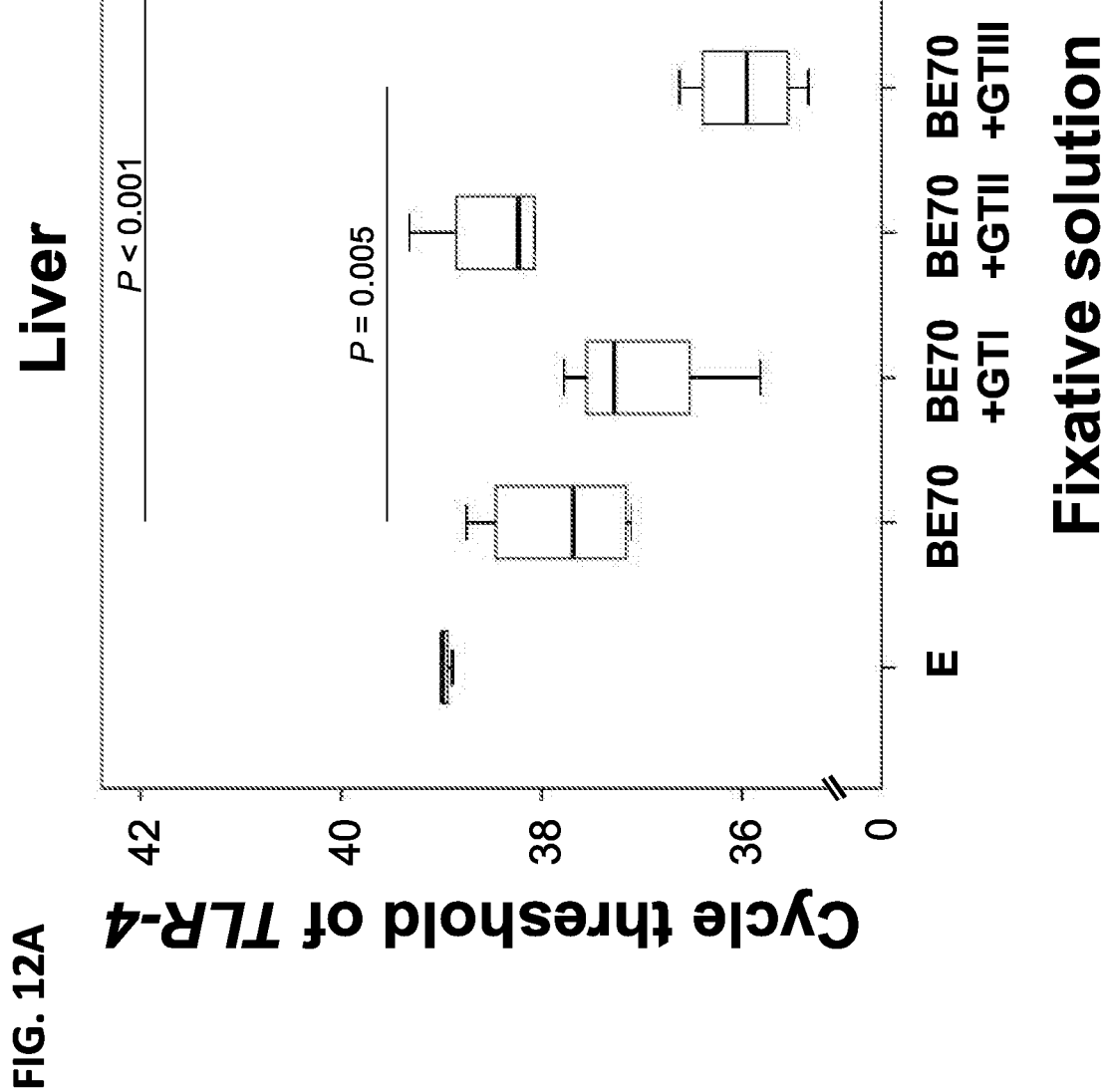
FIGS. 12A-12C are a series of graphs showing cycle threshold of TLR-4 in mouse liver (FIG. 12A), kidney (FIG. 12B), or liver+kidney (FIG. 12C) tissue fixed with the indicated solutions.
Figure 12B:
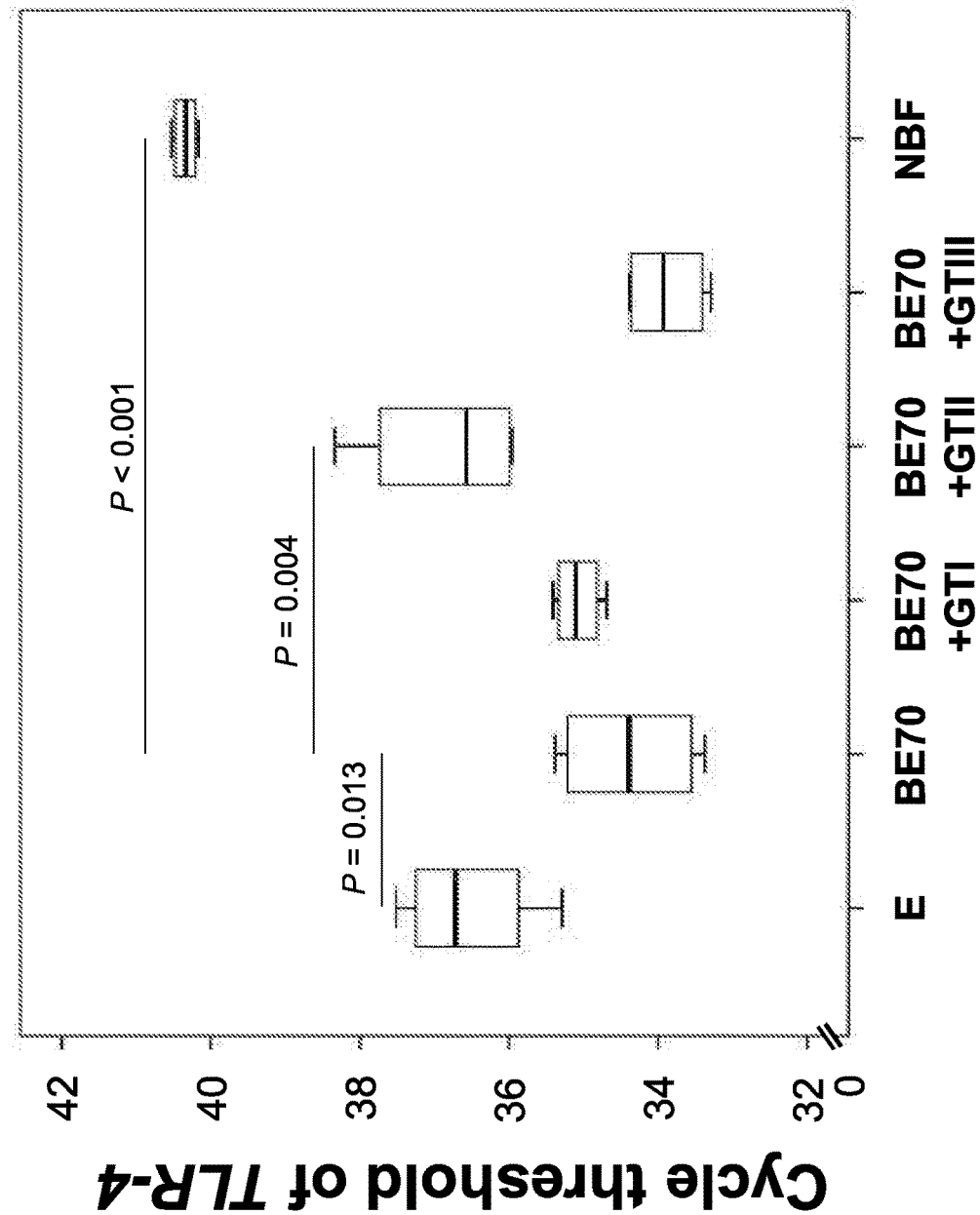
Figure 12C:
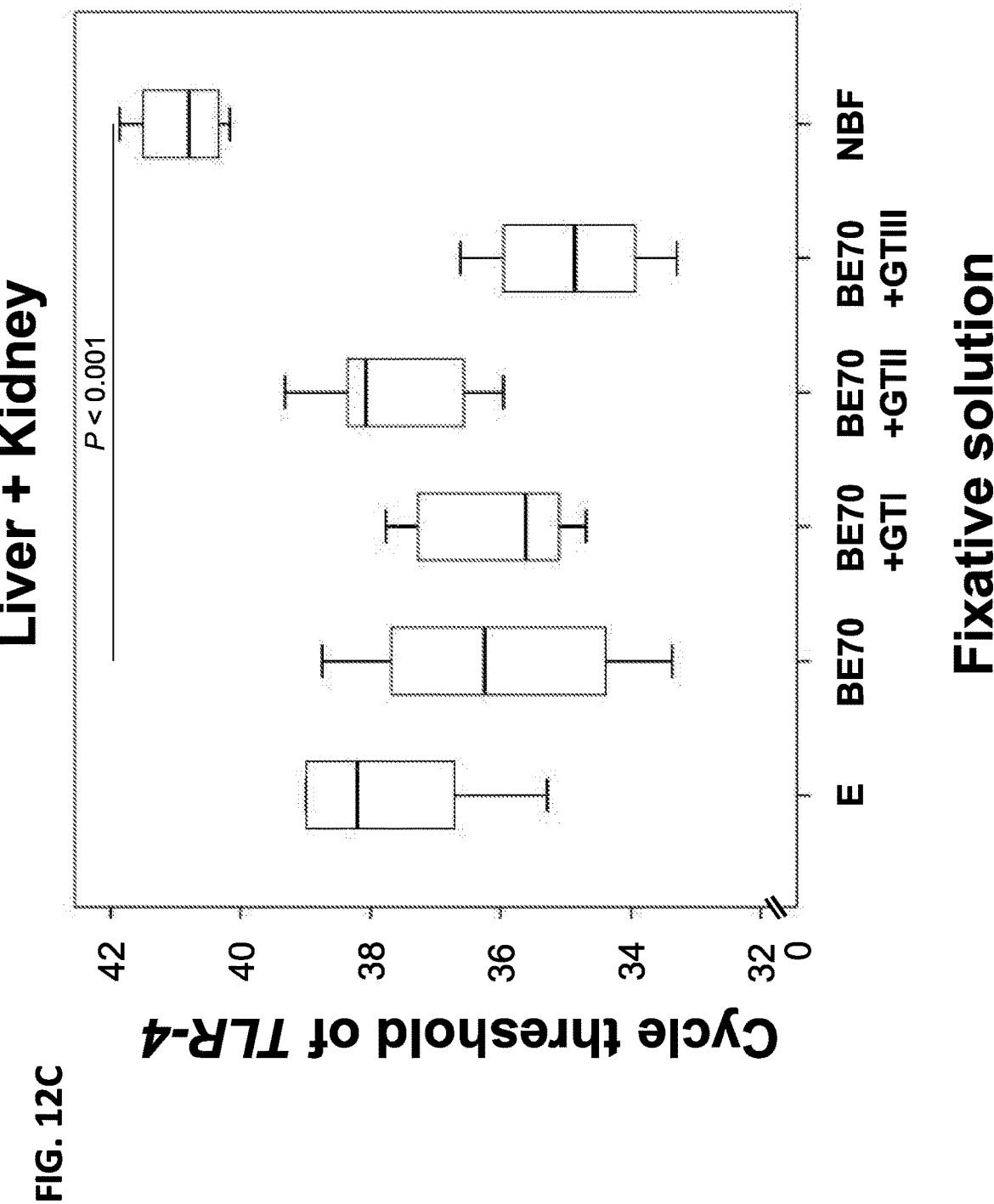
Figure 13A:
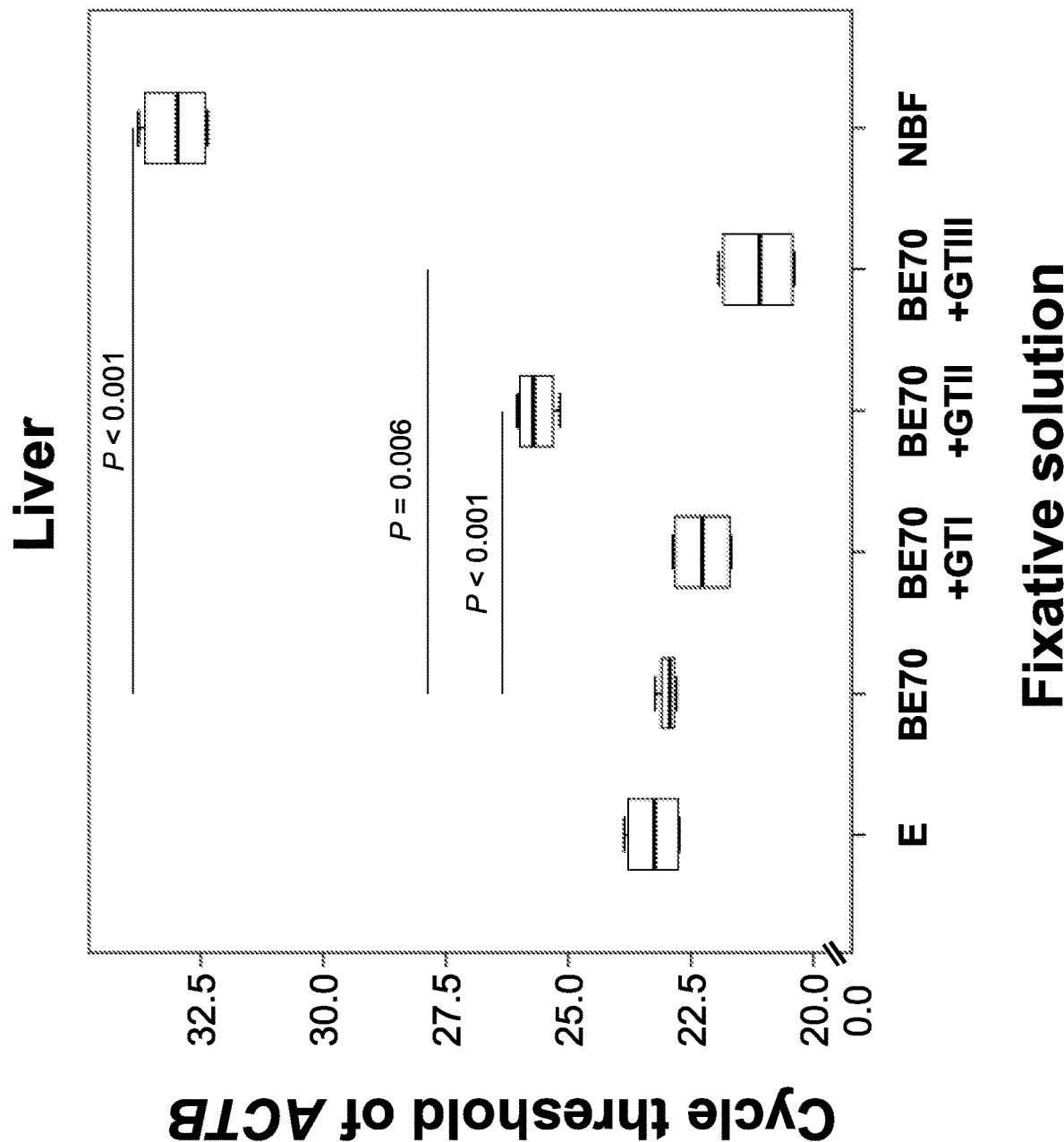
FIGS. 13A-13C are a series of graphs showing cycle threshold of ACTB in mouse liver (FIG. 12A), kidney (FIG. 12B), or liver+kidney (FIG. 12C) tissue fixed with the indicated solutions.
Figure 13B:
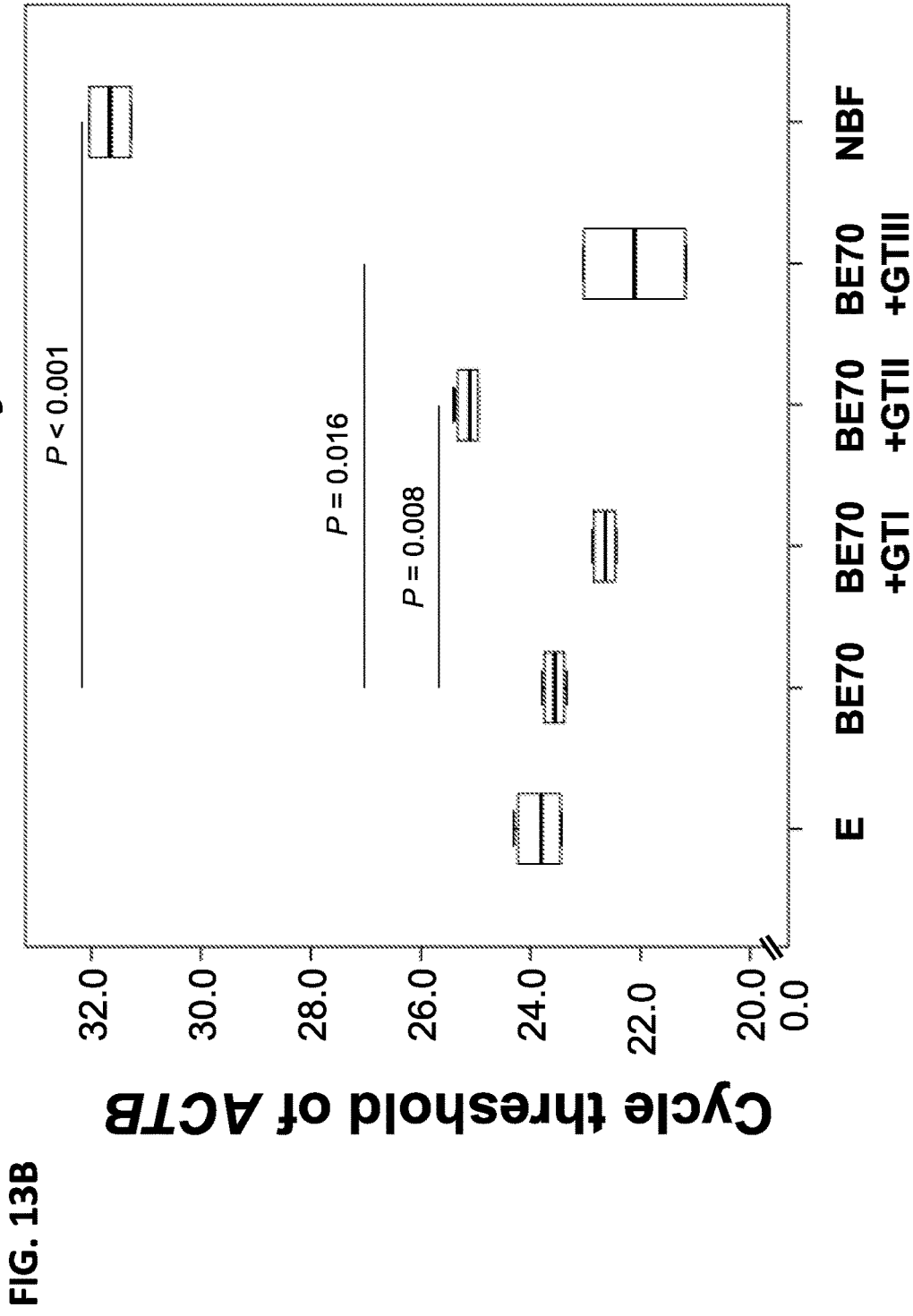
Figure 13C:
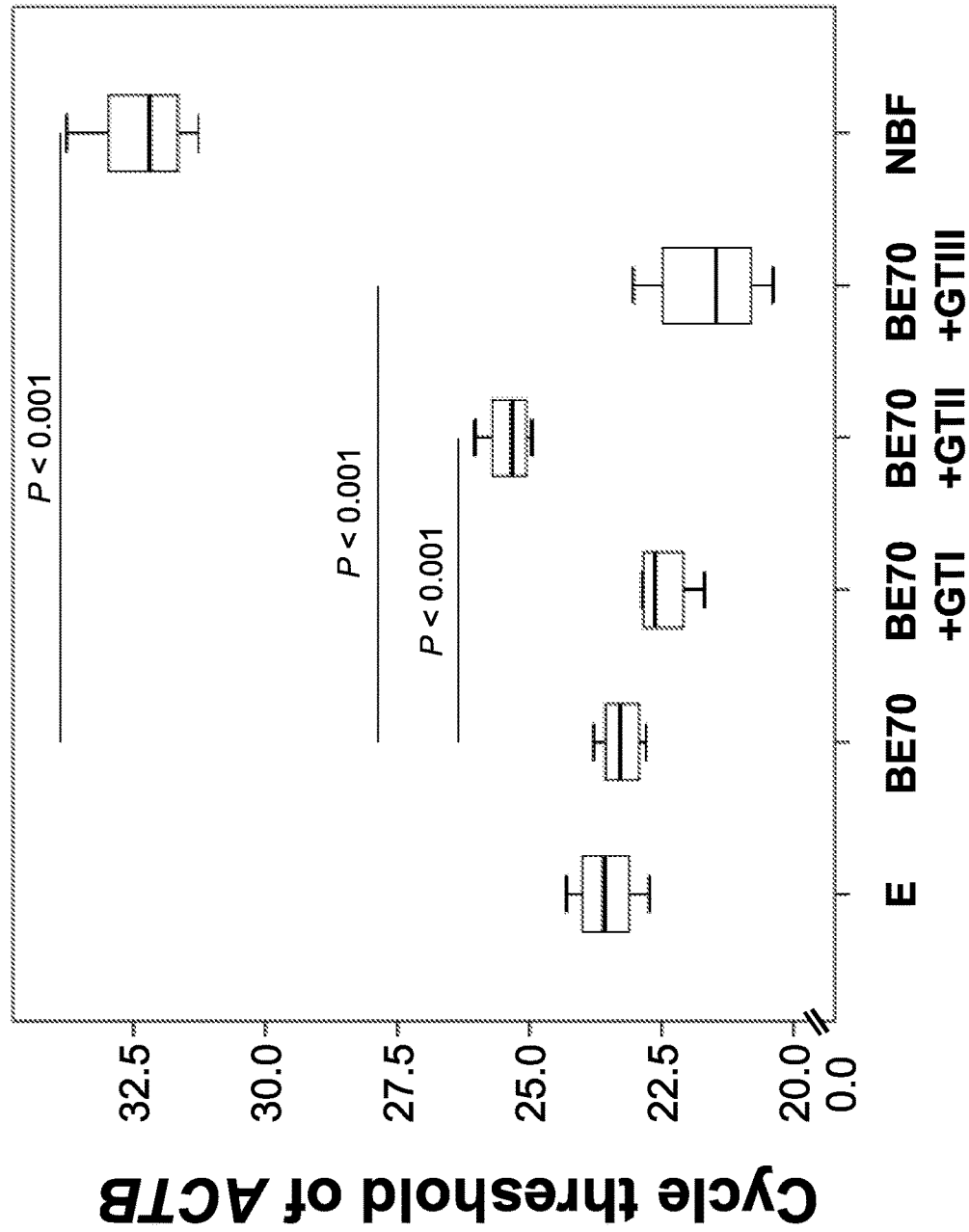

The effect of the different fixatives on RNA integrity was also evaluated by real-time quantitative RT-PCR using TLR-4 (FIGS. 12A-12C) and ACTB (FIG. 13A-13C) primers. The BE70+GT showed improved performance compared to NBF and equivalent or improved performance compared to BE70, at least at the two higher concentrations of GT.

Figure 14A:
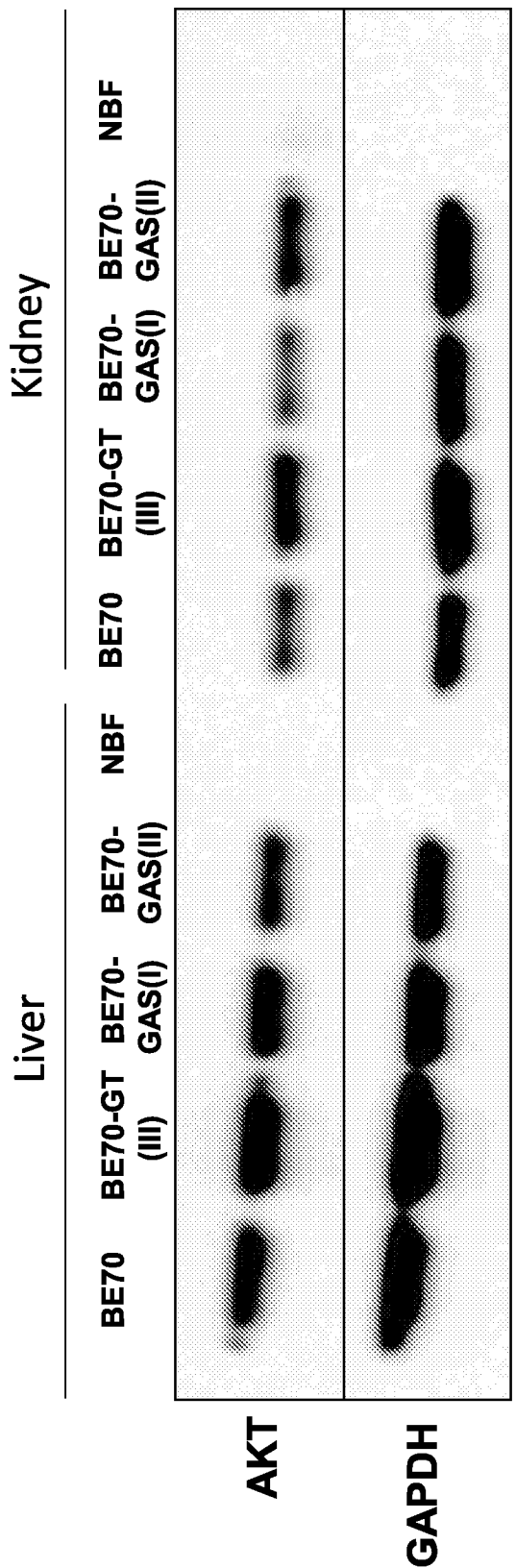
FIGS. 14A and 14B are panels showing Western blotting of AKT and GAPDH in mouse liver or kidney samples fixed with the indicated fixatives (FIG. 14A) or total protein recovery in mouse liver or kidney samples fixed with the indicated fixative (FIG. 14B).
Figure 14B:
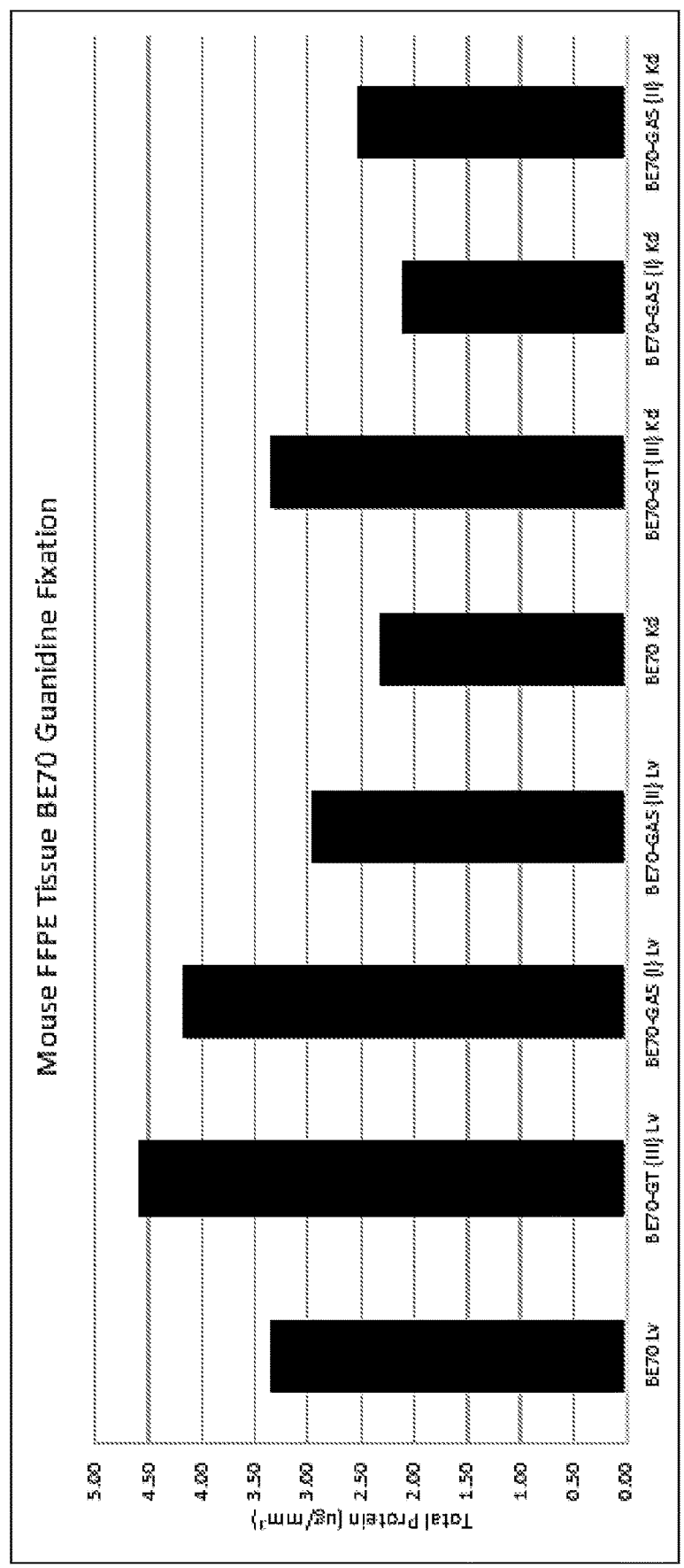

Western blotting and protein recovery were evaluated for liver and kidney samples fixed in BE70-GT (1.69 M GT) or BE70+GAS (FIGS. 14A and 14B). As demonstrated in FIGS. 14A and 14B, the presence of guanidinium in the fixative improved both the quantity of protein recovered (FIG. 14B) but when loaded into a western blot on an equal protein concentration, the detection of full length proteins by western blot was enhanced win the presence of guanidinium compared to both BE70 and NBF. This increase in both total protein quantity recovered, and the immunodetection of proteins (both AKT and GAPDH) when normalized for total protein loaded on the western blot is seen with guanidinium thiocyanate and guanidinium acetate, and in both instances occurs in a concentration depended manner, with higher concentrations of guanidinium associated with more protein recovered, and improved immunodetection.

The addition of guanidinium displaces unfreezable/non-freezable water, resulting a decrease in the degradation of full length peptides and nucleic acids. This displacement of unfreezable/non-freezable water results in the improved stability of the biospecimen, preventing hydrolysis and oxidation in the paraffin embedded block.

In view of the many possible embodiments to which the principles of the disclosure may be applied, it should be recognized that the illustrated embodiments are only examples and should not be taken as limiting the scope of the invention. Rather, the scope of the invention is defined by the following claims. We therefore claim as our invention all that comes within the scope and spirit of these claims.

We claim:

1. A fixative comprising 70% ethanol, 0.1-0.5× phosphate buffered saline, 0.1-5% glycerol, and 0.1-5% acetic acid, wherein the fixative does not comprise added aldehyde-containing compounds.

2. The fixative of claim 1, wherein the fixative comprises 70% ethanol (v/v), 0.5× phosphate-buffered saline (v/v), 0.1-5% glycerol (v/v), and 0.1-5% glacial acetic acid (v/v).

3. The fixative of claim 2, comprising 70% ethanol (v/v), 0.5×PBS (v/v), 1% glycerol (v/v), and 0.5% glacial acetic acid (v/v).

4. The fixative of claim 3, wherein the fixative consists of 70% ethanol (/v/), 0.5× phosphate buffered saline (v/v), 1% glycerol (v/v), and 0.5% glacial acetic acid (v/v).

5. A method, comprising immersing a cell or tissue sample in the fixative of claim 1, for 4 hours to 6 months at 4-30° C., thereby fixing the cell or tissue sample.

6. The method of claim 5, comprising immersing the sample in the fixative at room temperature for at least 12 hours.

7. The method of claim 5, further comprising processing the fixed sample, wherein the processing comprises:
dehydrating the fixed sample; and
embedding the dehydrated fixed sample in an embedding medium.

8. The method of claim 7, further comprising analyzing histomorphology of the sample and/or presence, amount, or quality of RNA, DNA, and/or protein in the sample.

9. The fixative of claim 1, further comprising at least one guanidinium salt.

10. The fixative of claim 9, wherein the guanidinium salt is selected from guanidinium thiocyanate, guanidinium HCL or guanidinium acetate.

11. A method, comprising immersing a cell or tissue sample in the fixative of claim 9 for 4 hours to 6 months at 4-30° C., thereby fixing the cell or tissue sample.

12. The fixative of claim 1, further comprising ethylenediaminetetraacetic acid or ethylene glycol-bis(β-aminoethyl ether) ethylenediaminetetraacetic acid; trichloroacetic acid; trehalose; acrylamide; polyethylene glycol; ethylene glycol; and/or acetonitrile.

13. A fixative comprising 70% ethanol, 0.1-0.5× phosphate buffered saline, and 0.1-5% glycerol (v/v), wherein the fixative does not comprise added aldehyde-containing compounds.

14. The fixative of claim 13, wherein the fixative comprises 70% ethanol (v/v), 0.5× phosphate buffered saline (v/v), and 1% glycerol (v/v).

15. The fixative of claim 14, wherein the fixative consists of 70% ethanol (v/v), 0.5× phosphate buffered saline (v/v), and 1% glycerol (v/v).

16. A fixative comprising 70% ethanol, 0.1-0.5× phosphate buffered saline, and 0.1-5% glacial acetic acid (v/v), wherein the fixative does not comprise added aldehyde-containing compounds.

17. The fixative of claim 16, wherein the fixative comprises 70% ethanol (v/v), 0.5× phosphate buffered saline (v/v) and 0.5% glacial acetic acid (v/v).

18. The fixative of claim 17, wherein the fixative consists of 70% ethanol (v/v), 0.5× phosphate buffered saline (v/v), and 0.5% glacial acetic acid (v/v).

19. A composition comprising an aqueous solution of 1.67×PBS (v/v), 3.33% glycerol (v/v), and 1.67% glacial acetic acid (v/v), wherein the composition does not comprise added aldehyde-containing compounds.

20. A method of preparing a fixative comprising mixing the composition of claim 19 with 100% or 95% ethanol to obtain a solution comprising 70% ethanol (v/v), 0.5× phosphate-buffered saline (v/v) 1% glycerol (v/v), and 0.5% glacial acetic acid (v/v).

21. The composition of claim 19, wherein the composition consists of an aqueous solution of 1.67× phosphate buffered saline (v/v), 3.33% glycerol (v/v), and 1.67% glacial acetic acid (v/v).

22. A fixative comprising 70% ethanol, 0.1-0.5× phosphate buffered saline, 0.1-5% glycerol, and 0.1-5% acetic acid, and at least one of paraformaldehyde and glutaraldehyde.

23. The fixative of claim 22, further comprising at least one guanidinium salt.

24. The fixative of claim 23, wherein the guanidinium salt is selected from guanidinium thiocyanate, guanidinium HCL or guanidinium acetate.

25. A method, comprising immersing a cell or tissue sample in the fixative of claim 23 for 4 hours to 6 months at 4-30° C., thereby fixing the cell or tissue sample.

26. A method, comprising immersing a cell or tissue sample in the fixative of claim 22 for 4 hours to 6 months at 4-30° C., thereby fixing the cell or tissue sample.

* * * * *